United States Patent [19]
Kato et al.

[11] Patent Number: 5,867,563
[45] Date of Patent: *Feb. 2, 1999

[54] LOCATION DISPLAY APPARATUS

[75] Inventors: Masami Kato, Sagamihara; Kentaro Matsumoto, Higashikurume; Tsunehiro Makino, Tokyo; Yasunori Hashimoto, Yokohama; Hiroyuki Nakanishi, Yokohama; Yasuyuki Nakamura, Yokohama; Atsushi Takahashi, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 573,538

[22] Filed: Dec. 15, 1995

[30] Foreign Application Priority Data

| Dec. 16, 1994 | [JP] | Japan | 6-334014 |
| Dec. 20, 1994 | [JP] | Japan | 6-334785 |
| Dec. 20, 1994 | [JP] | Japan | 6-334786 |

[51] Int. Cl.⁶ .................................................. H04M 3/22
[52] U.S. Cl. .................................. 379/88.01; 379/88.11; 379/88.12; 379/88.21; 379/93.17; 379/93.23
[58] Field of Search ............................... 379/67, 88, 89, 379/93, 96, 74, 201, 210, 211, 212, 93.01, 93.17, 93.23, 88.01, 88.04, 88.11, 88.12, 88.21

[56] References Cited

U.S. PATENT DOCUMENTS

| 4,794,639 | 12/1988 | Urui et al. | 379/89 |
| 4,853,952 | 8/1989 | Jachmann et al. | 379/88 |
| 4,885,765 | 12/1989 | Shirakawa | 379/93 |
| 4,956,861 | 9/1990 | Kondo | 379/142 |
| 4,969,182 | 11/1990 | Ohtsubo et al. | 379/67 |
| 4,996,704 | 2/1991 | Brunson | 379/67 |
| 5,093,857 | 3/1992 | Yoshida et al. | 379/201 |
| 5,138,655 | 8/1992 | Takashima et al. | 379/157 |
| 5,392,340 | 2/1995 | Otsuka | 379/100 |
| 5,428,672 | 6/1995 | Yoshida et al. | 379/100 |
| 5,434,906 | 7/1995 | Robinson et al. | 379/67 |
| 5,465,286 | 11/1995 | Clare et al. | 379/216 |
| 5,541,992 | 7/1996 | Tsuzuki et al. | 379/233 |
| 5,555,291 | 9/1996 | Inniss et al. | 379/67 |
| 5,557,666 | 9/1996 | Kim | 379/201 |

*Primary Examiner*—Daniel S. Hunter
*Attorney, Agent, or Firm*—Fitzpatrick, Cella, Harper & Scinto

[57] ABSTRACT

A location display apparatus has a display section for displaying a location and voice-synthesizes the location in response to a DTMF signal received from a circuit so as to transmit a corresponding message to the circuit. Moreover, in accordance with received DTMF signals, a power source of the apparatus is controlled, the message is transferred, and the displayed location is changed.

16 Claims, 42 Drawing Sheets

FIG. 2

| EXTENSION No. | LOCATION |
|---|---|
| 1 0 0 1 | ROOM No. 1 |
| 1 0 0 2 | ROOM No. 2 |
| 1 0 0 3 | ROOM No. 3 |
| 2 0 0 1 | MEETING ROOM No. 1 |
| 2 0 0 2 | MEETING ROOM No. 2 |
| 2 0 0 3 | MEETING ROOM No. 3 |

EXTENSION No. TABLE

FIG. 3A

| ID. No. | NAME | EXT. No. | LOCATION | MESSAGE |
|---|---|---|---|---|
| 3 0 0 0 1 | MR. SATO | 1 0 0 1 | ROOM No. 1 | × |
| 3 0 0 0 2 | MR. SUZUKI | 1 0 0 2 | ROOM No. 2 | ○ |
| 3 0 0 0 3 | MR. TANAKA | 1 0 0 3 | ROOM No. 3 | ○ |

LOCATION TABLE (BEFORE UPDATE)

FIG. 3B

| ID. No. | NAME | EXT. No. | LOCATION | MESSAGE |
|---|---|---|---|---|
| 3 0 0 0 1 | MR. SATO | 2 0 0 1 | MEETING ROOM No. 1 | ○ |
| 3 0 0 0 2 | MR. SUZUKI | 1 0 0 2 | ROOM No. 2 | ○ |
| 3 0 0 0 3 | MR. TANAKA | 1 0 0 3 | ROOM No. 3 | ○ |

LOCATION TABLE (AFTER UPDATE)

FIG. 3C

| ID. No. | NAME | EXT. No. | LOCATION | MESSAGE |
|---|---|---|---|---|
| 3 0 0 0 1 | MR. SATO | 2 0 0 1 | MEETING ROOM No. 1 | × |
| 3 0 0 0 2 | MR. SUZUKI | 1 0 0 2 | ROOM No. 2 | ○ |
| 3 0 0 0 3 | MR. TANAKA | 1 0 0 3 | ROOM No. 3 | ○ |

LOCATION TABLE (AFTER UPDATE)

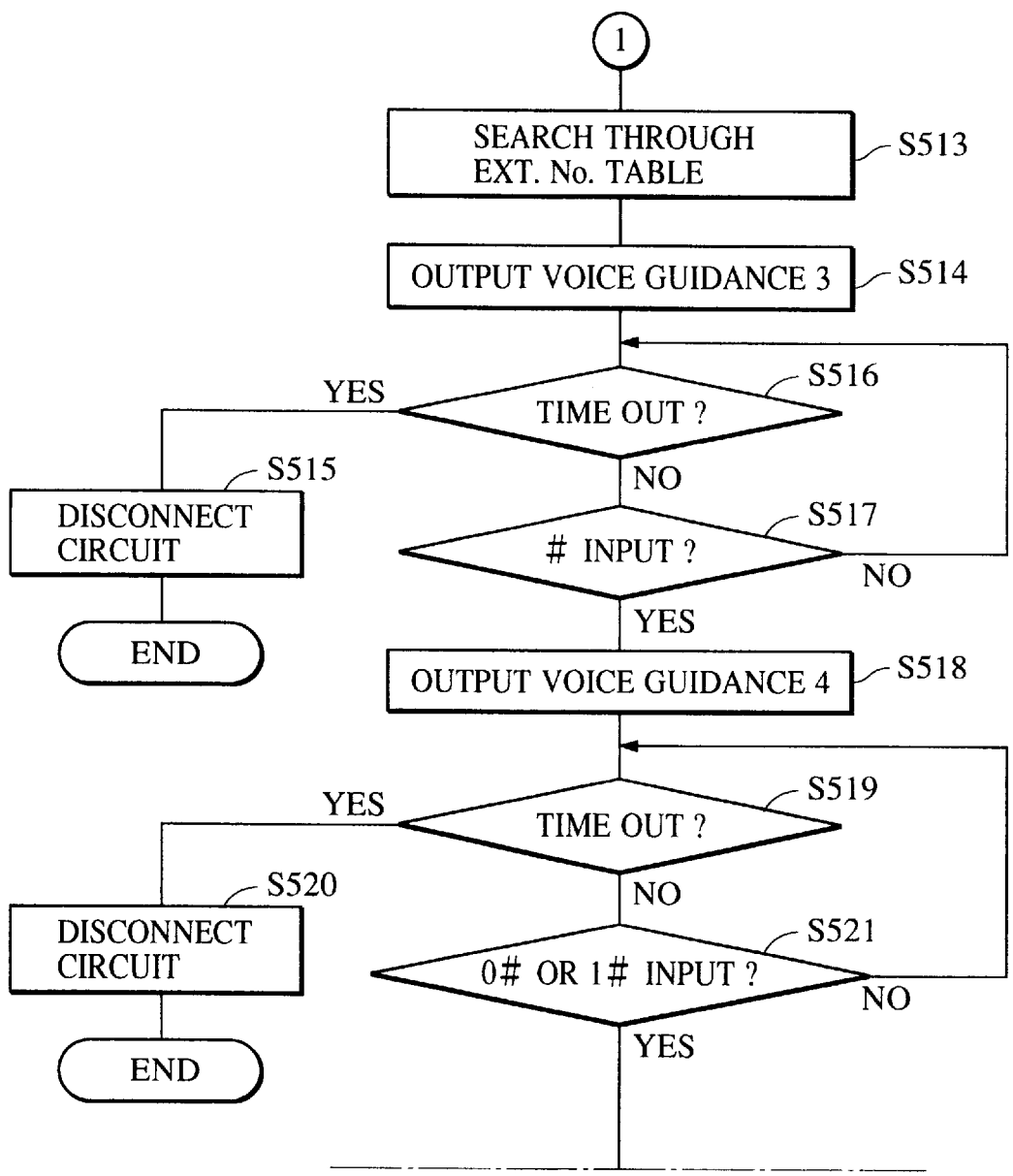
FIG. 4B1

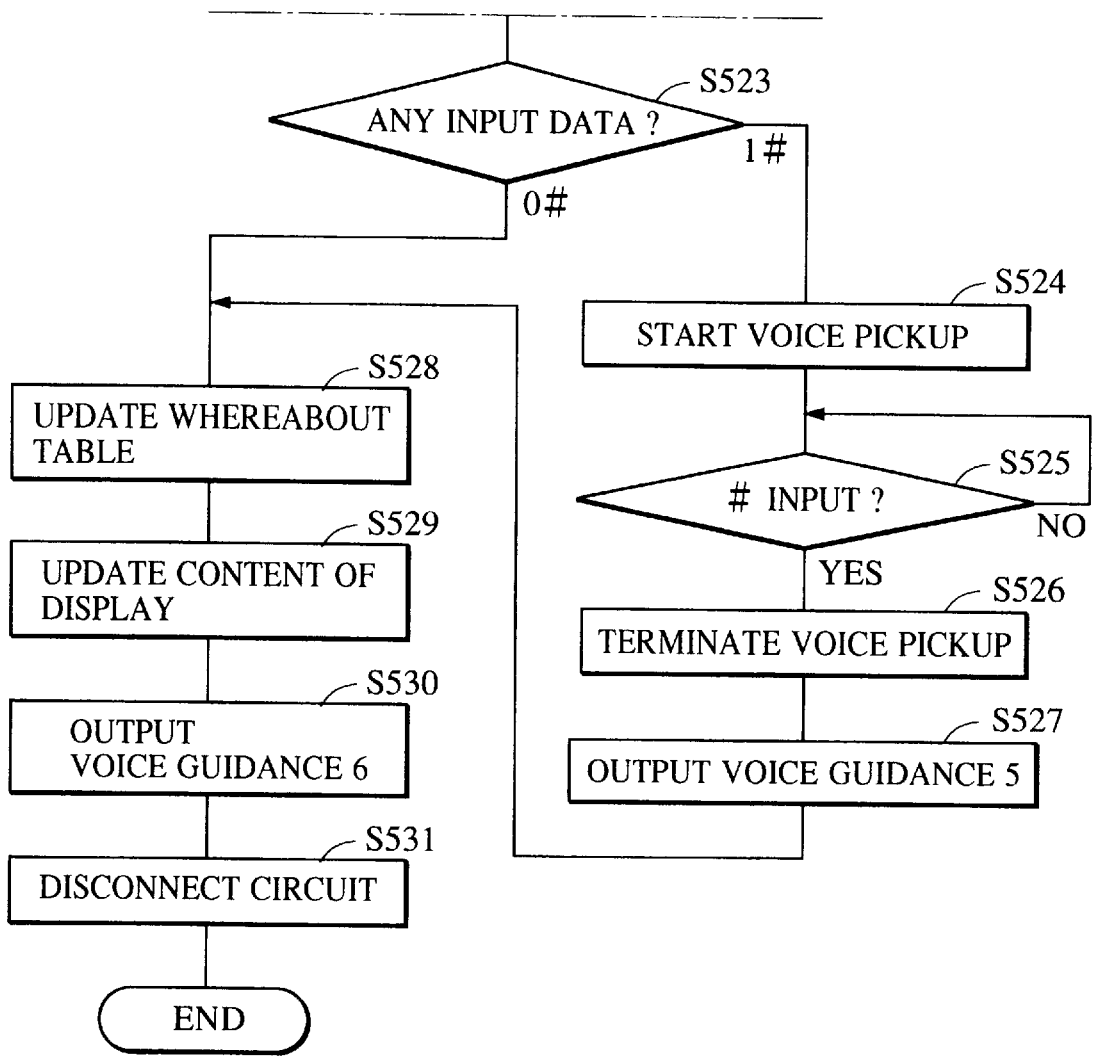

FIG. 15B1
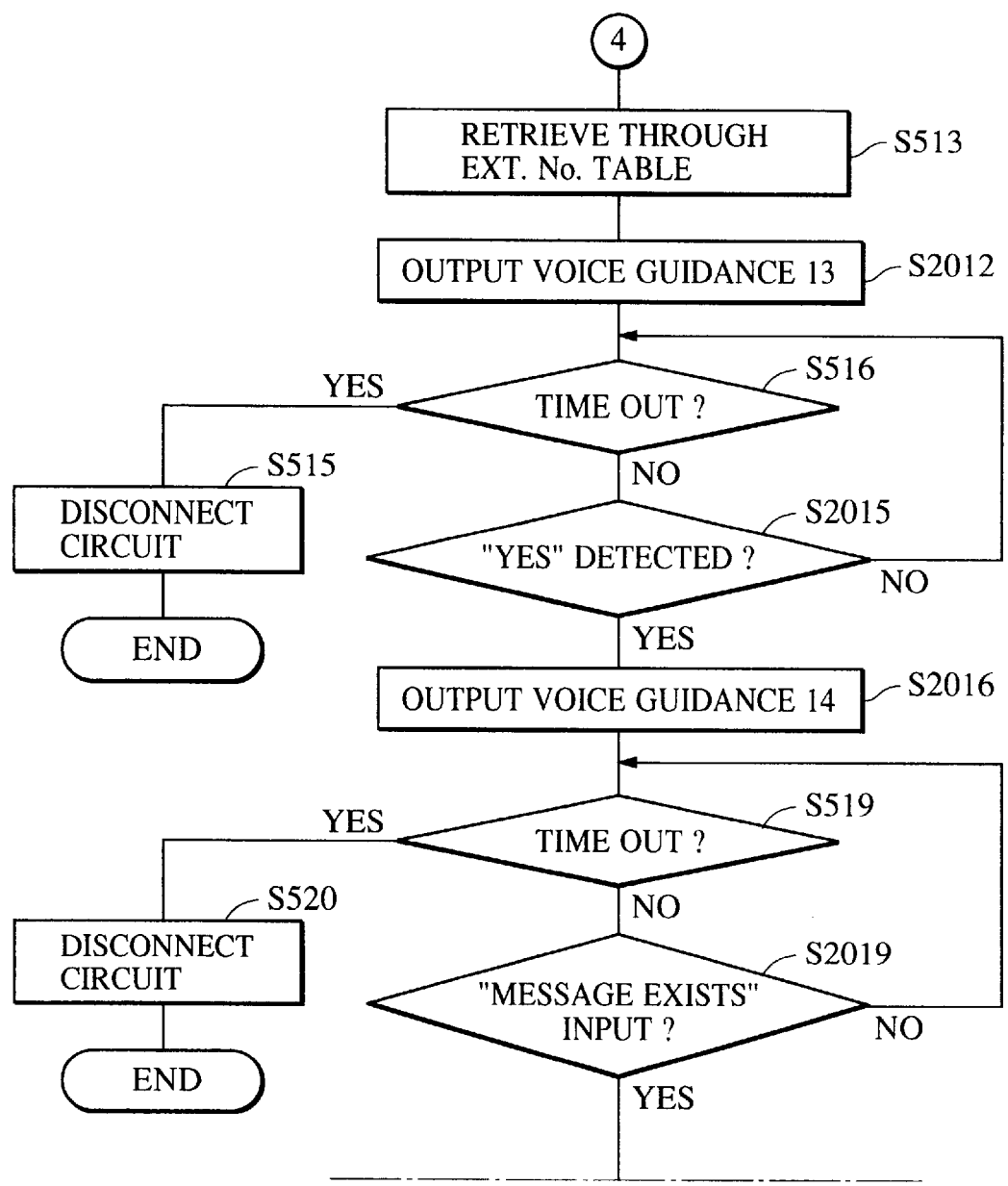

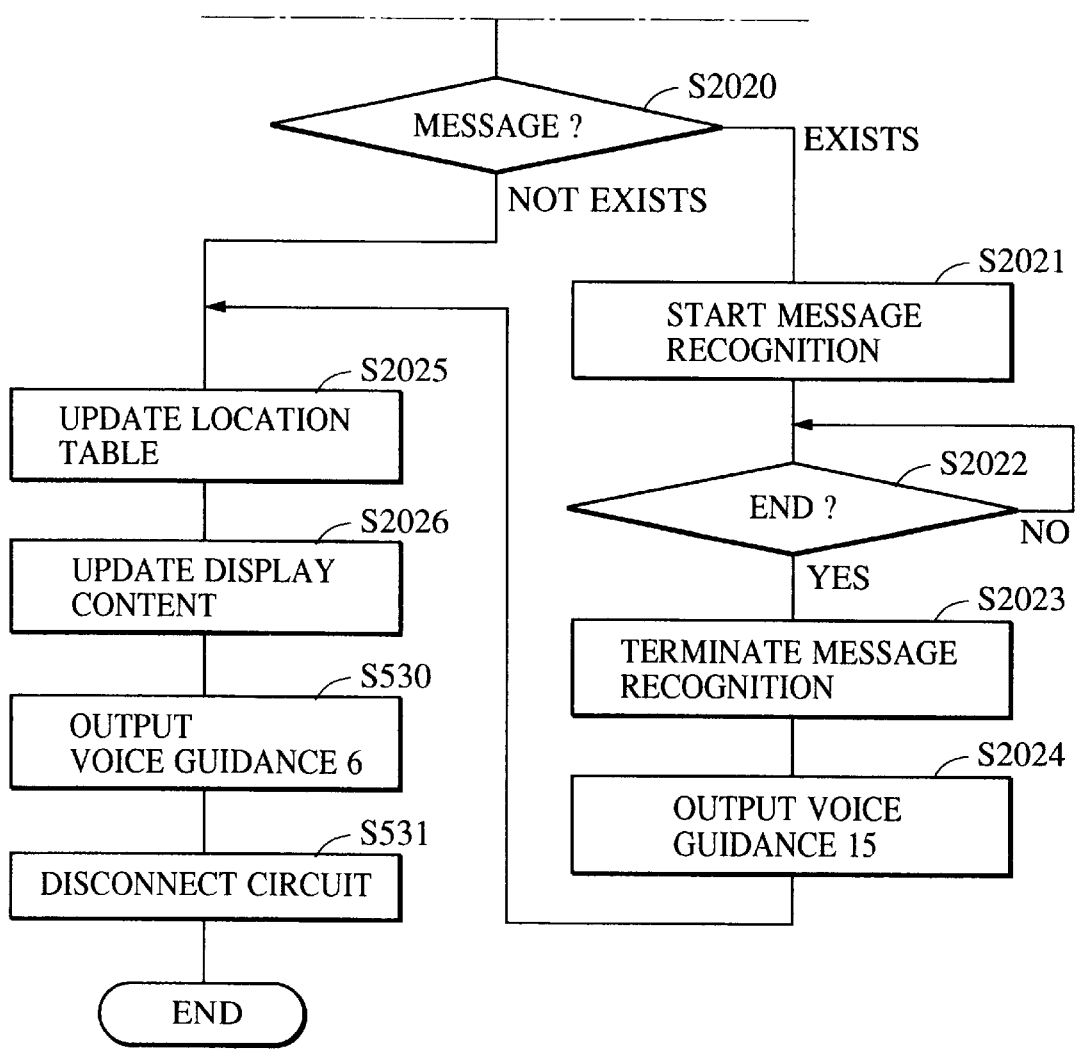

FIG. 16A

| ID. No. | NAME | EXT. No. | LOCATION | MESSAGE |
|---|---|---|---|---|
| 3 0 0 0 1 | MR. SATO | 1 0 0 1 | ROOM No. 1 | × |
| 3 0 0 0 2 | MR. SUZUKI | 1 0 0 2 | ROOM No. 2 | × |
| 3 0 0 0 3 | MR. TANAKA | 1 0 0 3 | ROOM No. 3 | × |

LOCATION TABLE (BEFORE UPDATE)

FIG. 16B

| ID. No. | NAME | EXT. No. | LOCATION | MESSAGE |
|---|---|---|---|---|
| 3 0 0 0 1 | MR. SATO | 2 0 0 1 | MEETING ROOM No. 1 | HAVING MEETING WITH MR. XX |
| 3 0 0 0 2 | MR. SUZUKI | 1 0 0 2 | ROOM No. 2 | × |
| 3 0 0 0 3 | MR. TANAKA | 1 0 0 3 | ROOM No. 3 | × |

LOCATION TABLE (AFTER UPDATE)

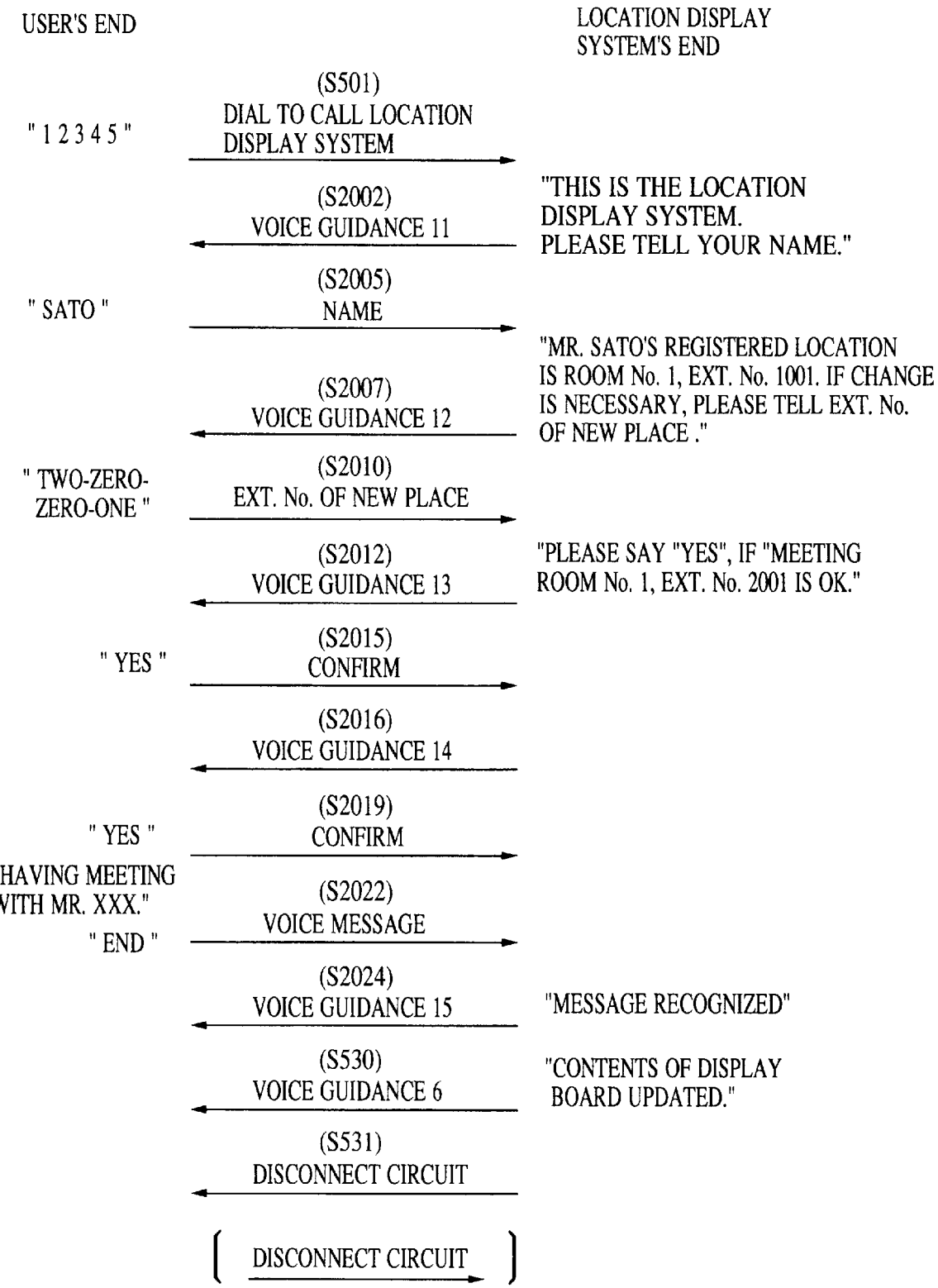

FIG. 18A

| ID. No. | NAME | EXT. No. | LOCATION |
|---------|------|----------|----------|
| 3 0 0 0 1 | MR. SATO | 1 0 0 1 | ROOM No. 1 |
| 3 0 0 0 2 | MR. SUZUKI | 1 0 0 2 | ROOM No. 2 |
| 3 0 0 0 3 | MR. TANAKA | 1 0 0 3 | ROOM No. 3 |

LOCATION TABLE (BEFORE UPDATE)

FIG. 18B

| ID. No. | NAME | EXT. No. | LOCATION |
|---------|------|----------|----------|
| 3 0 0 0 1 | MR. SATO | 2 0 0 1 | MEETING ROOM No. 1 |
| 3 0 0 0 2 | MR. SUZUKI | 1 0 0 2 | ROOM No. 2 |
| 3 0 0 0 3 | MR. TANAKA | 1 0 0 3 | ROOM No. 3 |

LOCATION TABLE (AFTER UPDATE)

FIG. 23A

| ID No. | NAME | EXT. No. | LOCATION | TRANSFER |
|---|---|---|---|---|
| 3 0 0 0 1 | MR. SATO | 1 0 0 1 | ROOM No. 1 | ◯ |
| 3 0 0 0 2 | MR. SUZUKI | 1 0 0 2 | ROOM No. 2 | ◯ |
| 3 0 0 0 3 | MR. TANAKA | 1 0 0 3 | ROOM No. 3 | ◯ |

LOCATION TABLE (BEFORE UPDATE)

FIG. 23B

| ID No. | NAME | EXT. No. | LOCATION | TRANSFER |
|---|---|---|---|---|
| 3 0 0 0 1 | MR. SATO | 2 0 0 1 | MEETING ROOM No. 1 | × |
| 3 0 0 0 2 | MR. SUZUKI | 1 0 0 2 | ROOM No. 2 | ◯ |
| 3 0 0 0 3 | MR. TANAKA | 1 0 0 3 | ROOM No. 3 | ◯ |

LOCATION TABLE (AFTER UPDATE)

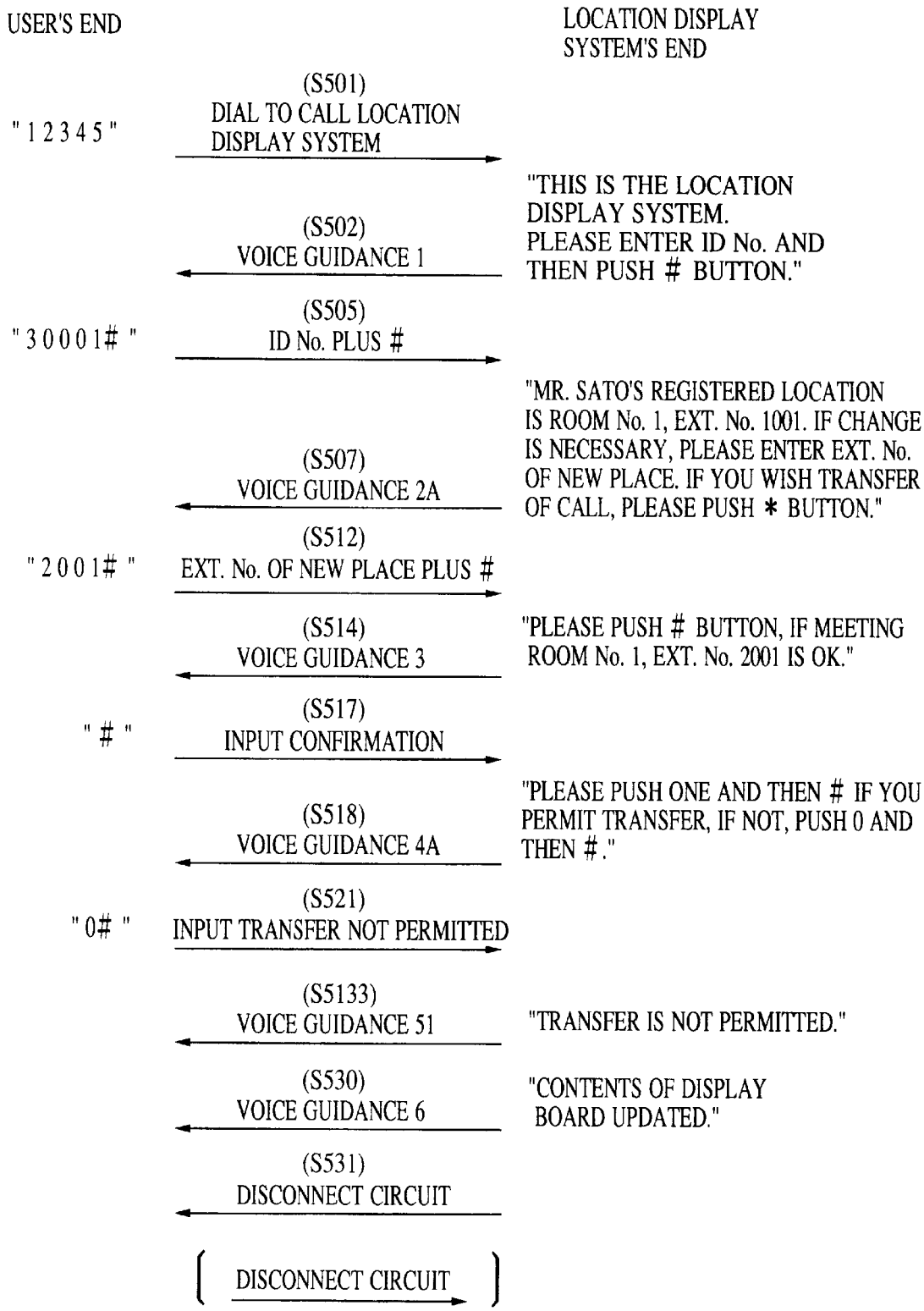

LOCATION DISPLAY APPARATUS

BACKGROUND OF THE INVENTION

1. Field of the Invention

The present invention relates to a location display apparatus which can change a displayed destination or location via a telephone line so that a person is able to inform his/her office of a change in destination or location from a remote area.

2. Description of the Related Art

In the conventional nonelectronic practice, a bulletin board or a so-called white board may be utilized to indicate the location of personnel in terms such as name and visiting destination, etc. Each person writes a destination on the white board using a marker pen, etc. before leaving for the destination. However, in this conventional location display apparatus, the displayed location information cannot be changed from a remote area. Moreover, if one person wishes to confirm a location of another person, he is inconveniently obliged to go to the site where the white board is provided.

SUMMARY OF THE INVENTION

In view of the foregoing drawbacks, it is an object of the present invention to provide a location display apparatus which enables users to freely change the indicated locations and to confirm the changed locations from a remote area.

According to one aspect of the present invention, there is provided a location display apparatus connected to a communication line, comprising display means for displaying location information indicating a location, memory means for storing a voice signal, and transmission means for transmitting to the communication line a response signal based on the contents of the display on the display means and the contents of the memory means, in response to a received signal received through the communication line.

BRIEF DESCRIPTION OF THE DRAWINGS

FIG. 2 is an illustration of an extension number table;

FIGS. 3A to 3C show location tables;

FIGS. 4A and 4B to 4B2, consisting of FIGS. 4B1 and 4B2, form a flowchart showing the operation of the first embodiment;

FIGS. 15A and 15B to 15B2, consisting of FIGS. 15B1 and 15B2, form a flowchart showing the operation of the fourth embodiment;

FIGS. 16A and 16B show a location table incorporated in the fourth embodiment;

FIG. 17 is a sequence chart explanatory of the operation of the fourth embodiment;

FIGS. 18A and 18B show a location table incorporated in a fifth embodiment of the present invention;

FIGS. 23A and 23B show a location table;

FIGS. 25 to 29 are sequence charts explanatory of the operation of the seventh embodiment;

DESCRIPTION OF THE PREFERRED EMBODIMENTS

Figure 1:
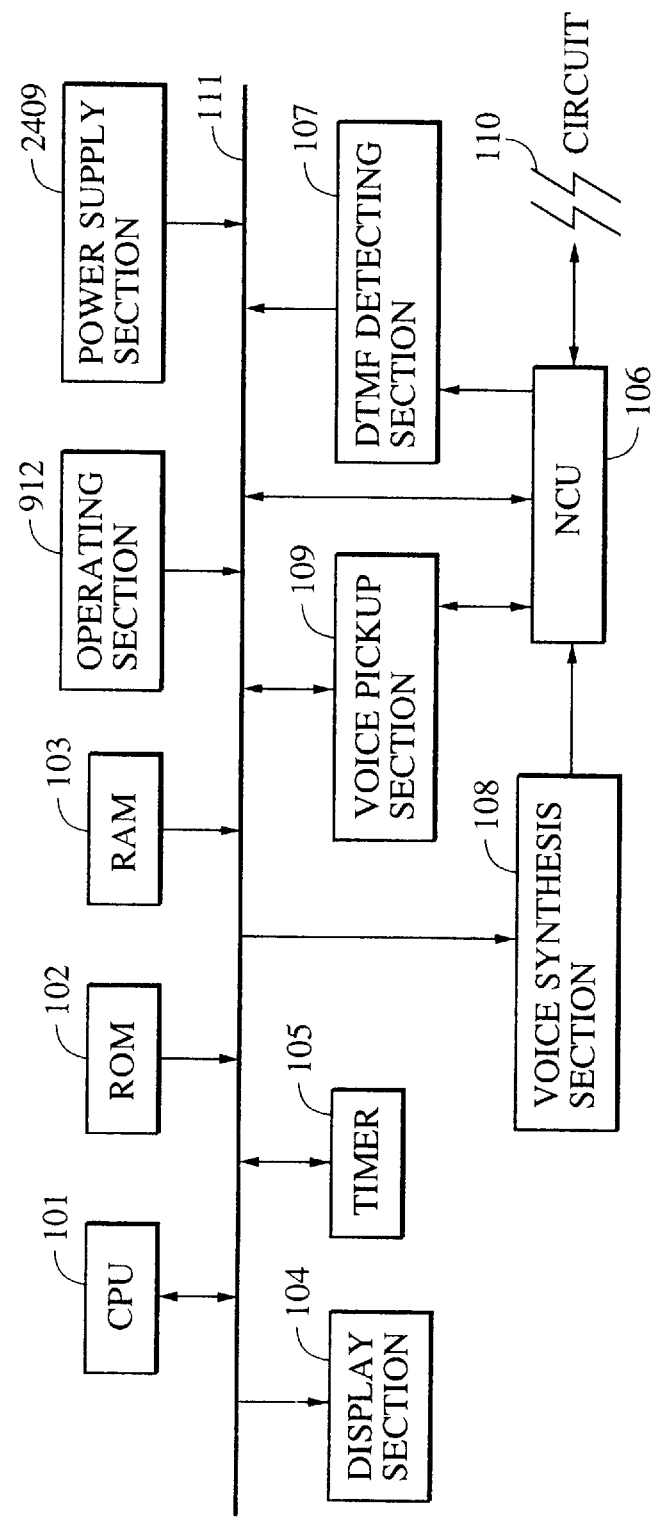
FIG. 1 is a block diagram of a first embodiment of the present invention.

FIG. 1 is a block diagram showing the circuitry of a first embodiment of the location display apparatus in accordance with the present invention.

Referring to this Figure, the location display apparatus has a CPU 101 which conducts monitoring and control of operation of the whole system, a ROM 102 serving as a memory which stores control programs in accordance with which the CPU performs various control operations, and a RAM 103 serving as a work area which is utilized by the CPU 101 when conducting the control operations. The RAM 103 includes an extension number table containing phone extension numbers together with the locations or places corresponding to them, and a location table containing persons' names and their ID numbers together with current locations.

The location display apparatus has a display section 104 of, for example, an LCD type, used to display the registered locations of the persons, and a timer 105 which provides time reference to enable the CPU 101 to perform various control operations. The location display apparatus further has a network control unit (referred to as "NCU", hereinafter) which operates to connect and disconnect the apparatus to and from a communication line or a telephone circuit 110 and which serves as an interface for signal exchange between the apparatus and the telephone circuit.

The location display apparatus further has a DTMF detecting section 107 which serves to detect DTMF signals, which are tone signals, and a voice synthesis section 108 which synthesizes and outputs voice messages to enable the location display apparatus to respond to inquiries from the telephone circuit. The telephone circuit 110 may be an ordinary public telephone circuit or a private telephone circuit. The exchange of signals between the CPU 101 and other parts of the apparatus is conducted through a BUS 111.

FIG. 2 illustrates an example of the extension number table which shows phone extension numbers and corresponding locations or places, while FIGS. 3A–3C show, by way of example, a location table which shows the names of registered persons and their locations, i.e., the registered locations or places where these persons are present or where these persons can be accessed by telephone.

Figure 4A:
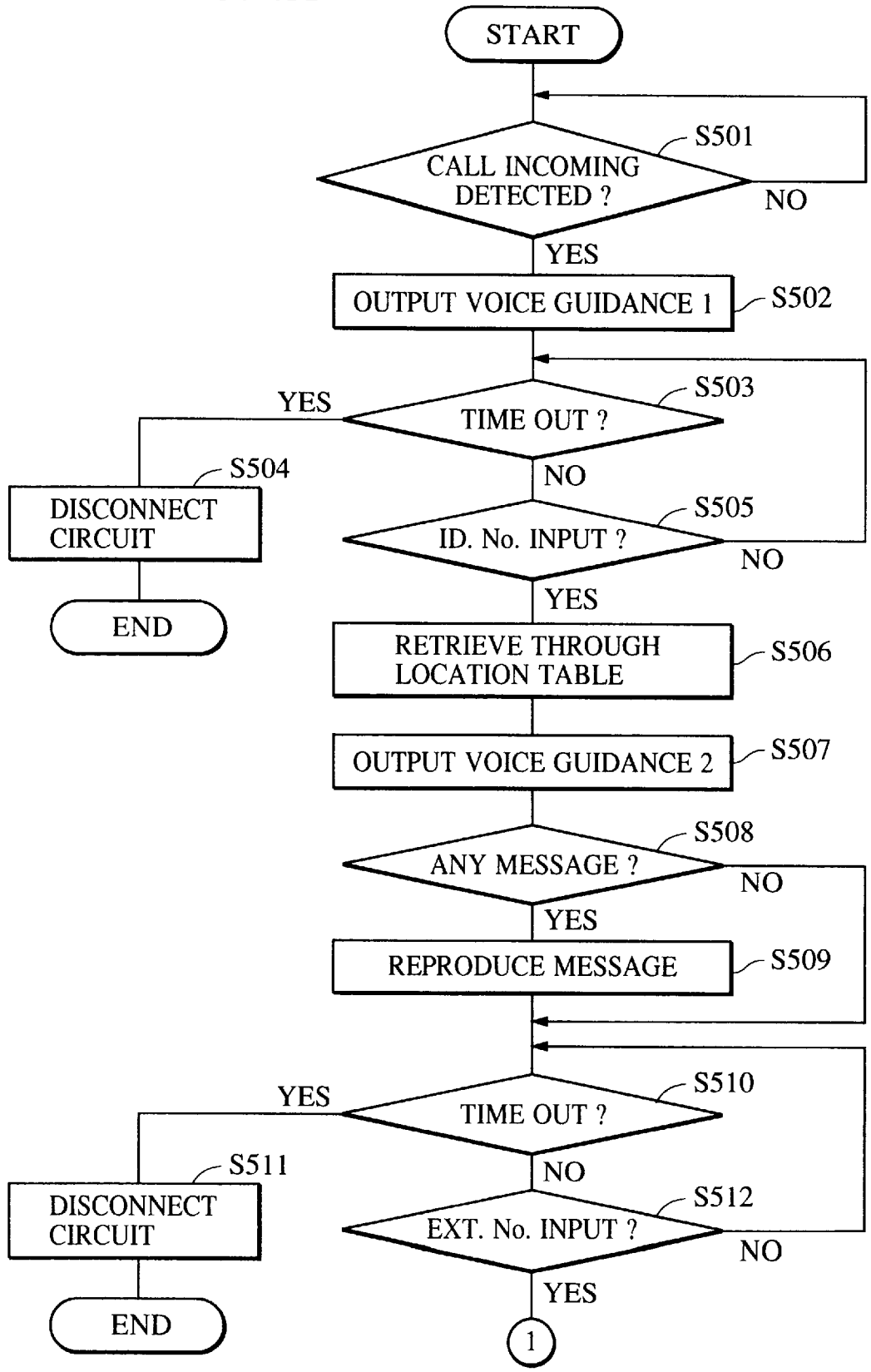
Figure 5:
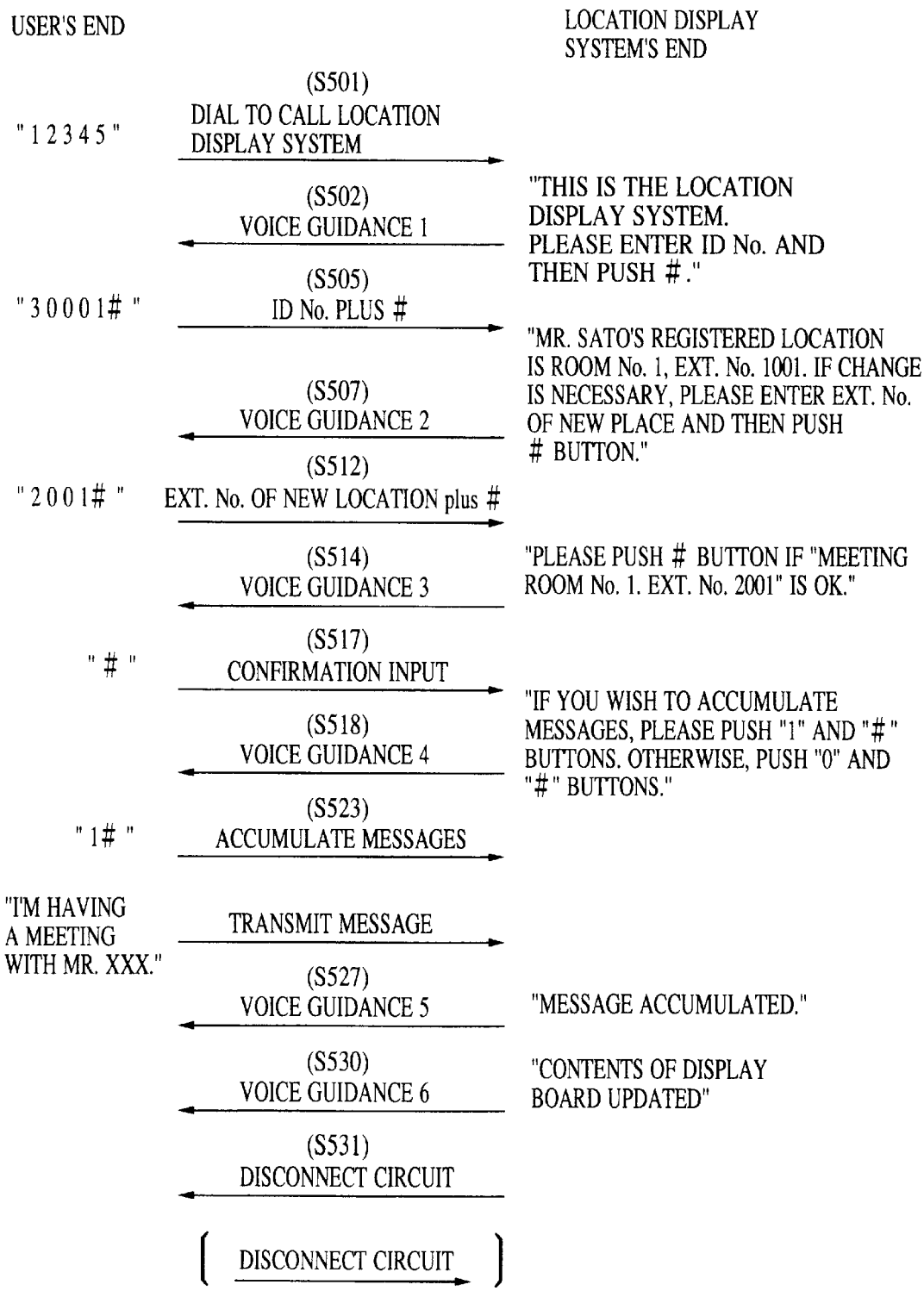
FIGS. 5 and 6 are sequence charts explanatory of the operation of the first embodiment.
Figure 6:
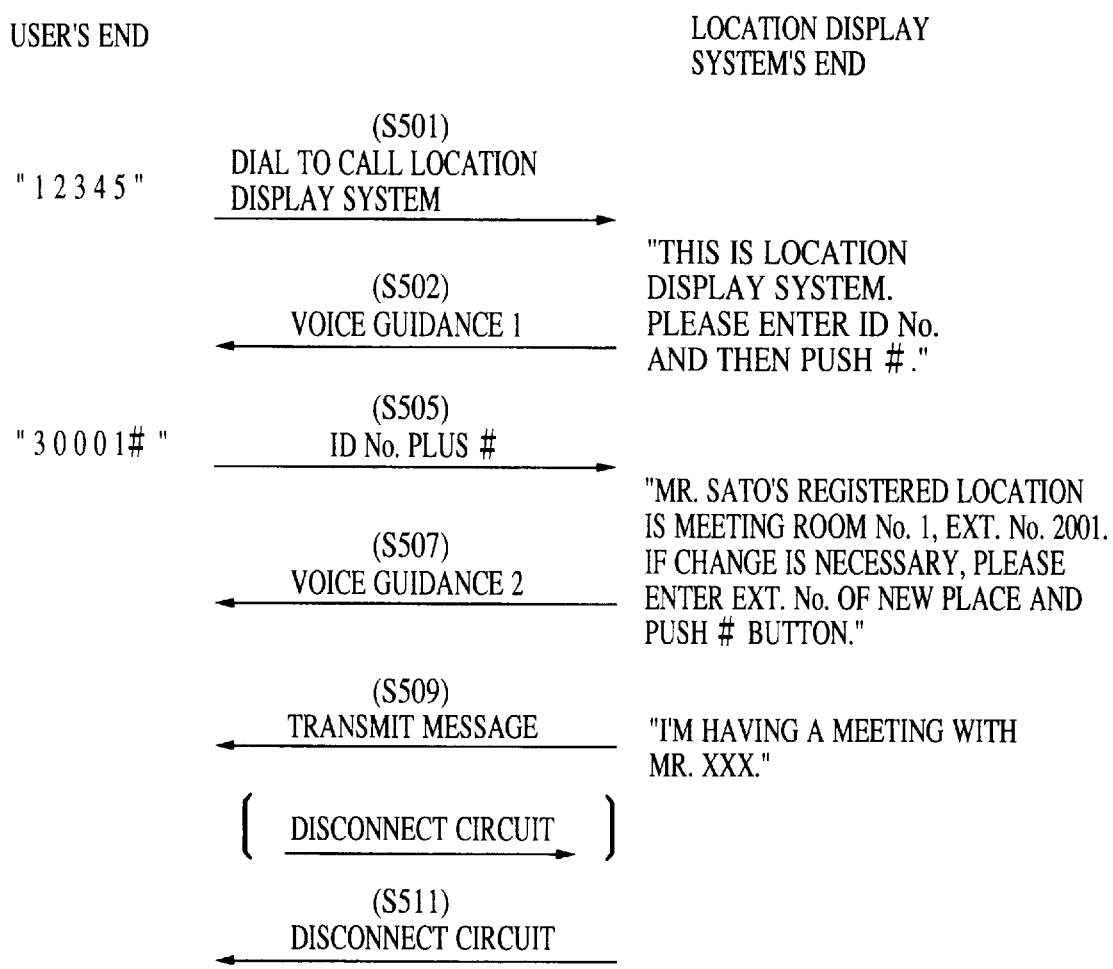

FIGS. 4A and 4B are flowcharts showing the operation of the first embodiment in managing the location table of the present invention, while FIGS. 5 and 6 are sequence charts illustrative of the interaction between the location display apparatus and a user.

The extension number table as shown in FIG. 2 and the location table as shown in FIGS. 3A and 3B, showing the relationships between individual users and their locations, are stored in the RAM 103 and are administrated by the CPU 101. The display section 104 displays the location table shown in FIG. 3A.

Figure 7:
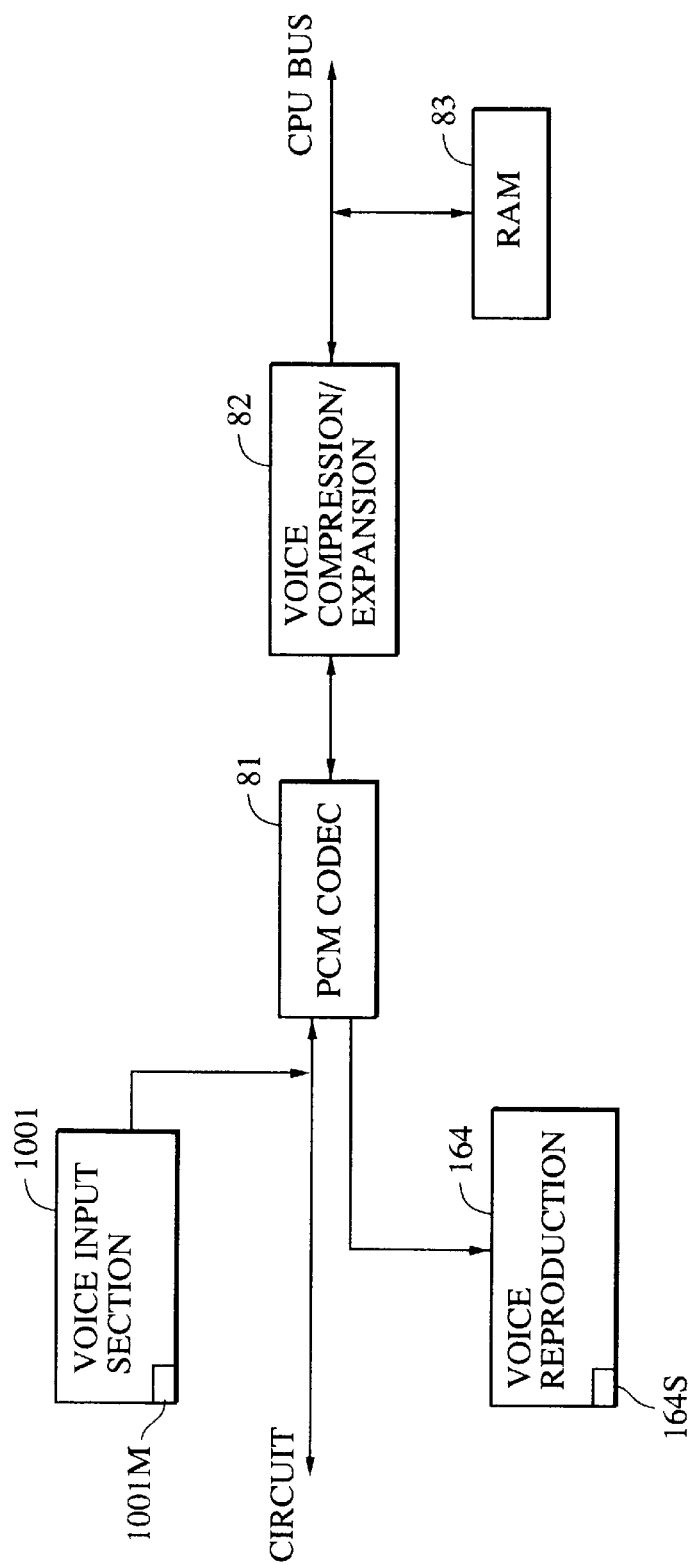
FIG. 7 is a block diagram of a voice pickup section.

FIG. 7 is a block diagram showing the construction of the voice pickup section 109.

A PCM (Pulse Code Modulation) codec 81 samples and quantizes analog voice data on the circuit so as to convert the analog data into digital data. At the same time, the PCM codec 81 also performs digital-to-analog conversion so as to deliver the analog data to the telephone circuit.

A voice compression/expansion section 82 performs compression and expansion of converted or stored digital data in accordance with, for example, an ADPCM (Adaptive Differential PCM) technique.

A RAM 83 accumulates compressed voice data. Compression of data is not essential but this technique is employed in most cases in order to reduce the volume of the data to be accumulated in a limited storage area.

The voice pickup section 109 conducts processings such as accumulation and reproduction under the control of the CPU 101.

A description will be given with specific reference to FIGS. 4A, 4B and 5 as to the operation procedure followed when an operator, i.e., a user, changes his location and stores a message through a telephone (not shown) capable of outputting DTMF signals or a tone dialer (not shown).

The CPU 101 monitors, through the BUS 111, data derived from the NCU 106 (FIG. 4A, S501). Mr. SATO, the user, makes a call through the circuit 110, so that the CPU 101 detects the incoming call from the circuit 110 (S501). The CPU 101 then delivers to the voice synthesis section 108 data to be used for the voice synthesis, through the BUS 111. The synthetic voice data is converted into analog signal which is then transmitted in the form of a voice guidance 1 to the telephone of the user, via the NCU 106 and the circuit 110. As shown in FIG. 5, the content of the voice guidance 1 is, for example, "THIS IS THE LOCATION DISPLAY SYSTEM. PLEASE ENTER ID No. AND THEN PUSH SHARP (#) BUTTON".

The CPU 101 then waits for the entry of the ID number by the user. The user enters, through the telephone capable of transmitting DTMF signals or by a tone dialer, his own ID number and then presses the sharp (#) button (S505). The sharp (#) button is used as a key which enters a code indicative of completion of entry of a number consisting of a plurality of digits. If no input by the user is detected within a predetermined period (S503), the CPU 101 conducts an error processing so as to disconnect the circuit 110 (S504), thus terminating the process.

Conversely, when an input from the user is detected, the CPU 101 receives this input through the circuit 110, NCU 106 and the DTMF detecting section 107, and acquires (S506) storage address data such as the user's name, phone extension number, location data and any accumulated voice compression/expansion data from the table shown in FIG. 3A, based on the ID number input by the user.

The CPU 101 then operates to deliver a voice guidance 2 through the circuit 110 (S507). The content of the voice guidance 2 is, for example, "MR. SATO'S REGISTERED LOCATION IS ROOM No. 1, EXTENSION No. 1001. IF CHANGE IS NECESSARY, PLEASE ENTER EXTENSION No. OF NEW PLACE AND THEN PUSH SHARP (#) BUTTON.". If any message has been stored (S508), the voice pickup section 109 performs reproduction of the message (S509) in accordance with the acquired storage address data, and delivers a voice message through the circuit. FIG. 5 shows, by way of example, the operation which is executed when there is no message.

The CPU 101 is now ready for receiving instructions to be entered by the user Mr. SATO. If Mr. SATO wishes to change his location, i.e., where to contact him, to meeting room No. 1, he confirms the present registered location and the message and then enters the phone extension No. 2001, followed by the entry of the end code by pressing the sharp (#) button (S512). If no instruction from the user is detected for a predetermined time (S510), the CPU 101 conducts the error processing so as to disconnect the circuit 110 (S511), thus terminating the process.

Upon receipt of the instruction from the user through the circuit 110 and the DTMF detecting section 107, the CPU 101 operates to acquire the place data from the extension number table shown in FIG. 2, based on the entered phone extension number (FIG. 4B1, S513).

The CPU 101 then operates to deliver a voice guidance 3 through the circuit 110 (S514). The content of the voice guidance 3 is, for example, "PLEASE PUSH SHARP (#) BUTTON IF MEETING ROOM No. 1, EXT. No. 2001 IS OK.". In this state, the CPU 101 waits for entry of confirmation by the user. If the content of the guidance is correct, the user pushes the sharp (#) button to acknowledge the guidance (S517).

If no answer input from the user is detected for a predetermined time (S516), the CPU 101 conducts the error processing so as to disconnect the circuit 110 (S515), thus terminating the process.

If the entry of acknowledgment through the # key is detected, the CPU 101 operates to give a voice guidance 4 through the circuit 110 (S518). The content of the voice guidance 4 is, for example, "IF YOU WISH TO ACCUMULATE MESSAGES, PLEASE PUSH, PLEASE PUSH "1" AND "#" BUTTONS. OTHERWISE, PUSH "0" AND "#" BUTTONS.". Thus, the CPU 101 waits for entry of instructions from the user. Mr. SATO, the user, then pushes the "1" and then "#" buttons if he wishes to store a message (S521). If no answer input from the user is detected for a predetermined time (S519), the CPU 101 conducts the error processing so as to disconnect the circuit 110 (S520), thus terminating the process.

The voice pickup section 109 is started when the request for storage of a message is input through the "1" and "#" buttons (FIG. 4B2, S523). The voice pickup section 109 picks up the voice data on the telephone line 110 so as to store the data as the message (S524). In this case, the message is, for example, "I'M HAVING A MEETING WITH MR. XXX.".

The CPU 101 continues the operation for picking up the voice data until an end code is input through the sharp (#) key (S526). After the pickup of the voice data is terminated, the CPU 101 sends back a voice guidance 5 (S527). The content of this voice guidance is, for example, "MESSAGE ACCUMULATED". Then, the location table is updated from the state shown in FIG. 3A to the state shown in FIG. 3B (S528). It will be seen that the location of Mr. SATO is changed from room No. 1, extension No. 1001 to meeting room No. 1, extension No. 2001 and that a change also is effected from "NO MESSAGE" (x) to "THERE IS A MESSAGE"(o). The contents of the display section 104 also are changed (S529) in accordance with the change in the contents of the location table.

The CPU 101 then transmits a voice guidance 6. The content of this voice guidance is, for example, "CONTENTS OF DISPLAY BOARD UPDATED.". The CPU 101 then disconnects the circuit 110, thus terminating the processing. The whole process for updating the location display board is then completed when the user hooks the telephone on.

A description will now be given of the operation for the case where a user gets in touch with the location display apparatus through a telephone capable of outputting DTMF signals or a tone dialer, in order to know where to contact another person, as well as to get any message from such a person, with specific reference to FIGS. 4 and 5.

The CPU 101 monitors, through the BUS 111, the data derived from the NCU 106 (S501). Suppose Mr. SUZUKI now gets in touch with the location display apparatus in order to learn the location of Mr. SATO. Upon receipt of the incoming call from Mr. SUZUKI through the circuit 110, the CPU 101 operates to transmit the voice guidance 1 to the user's telephone (S502).

In this state, the CPU 101 is ready to receive entry of the ID number by the user. In this case, the user. Mr. SUZUKI, enters the ID No. 30001 which is Mr. SATO's ID. number, followed by input of end code through the sharp (#) key (S505), by using the above-mentioned telephone or dialer.

When the entry is detected, the CPU 101 detects the entered signal through the circuit 110, NCU 106 and the DTMF detecting section 107, and acquires the name of the identified person, phone extension number and the location data from the table shown in FIG. 3A, based on the entered ID number (S506).

The CPU 101 then delivers the voice guidance 2 through the circuit 110 (S507). The content of the voice guidance 2 is, for example, "MR. SATO'S REGISTERED LOCATION IS ROOM No. 1, EXT. No. 1001. IF CHANGE IS NECESSARY, PLEASE ENTER EXT. No. OF NEW PLACE AND PUSH " #" BUTTON.".

A stored message (S508), if any, is then reproduced through the voice pickup section 109 (S509). The content of the message is, for example, "I'M HAVING A MEETING WITH MR. XXX.".

The CPU 101 is then enabled to receive a subsequent input, after the delivery of the above-mentioned message. In this case, however, the user, Mr. SUZUKI, has obtained all the necessary information, so that he hooks the telephone on so as to disconnect the circuit 110. Since no input by the user is detected for a predetermined time (S510), the CPU disconnects the circuit (S511), thus terminating the processing.

It is thus possible to confirm and update location data and to accumulate and confirm any message, by contacting from a remote place the location display apparatus by means of a telephone capable of transmitting DTMF signals or a tone dialer, via a public telephone network or a private network and then through the telephone circuit 110.

A description will now be given of a second embodiment of the location display apparatus in accordance with the present invention.

The second embodiment features the use of an operating section 912 such as a keyboard through which an operator or user operates the location display system.

Referring to FIG. 7, the voice pickup section 109 has a voice input section 1001 which incorporates a microphone 1001M, an amplifier and so forth and which converts voice signals into electric signals.

Figure 8:
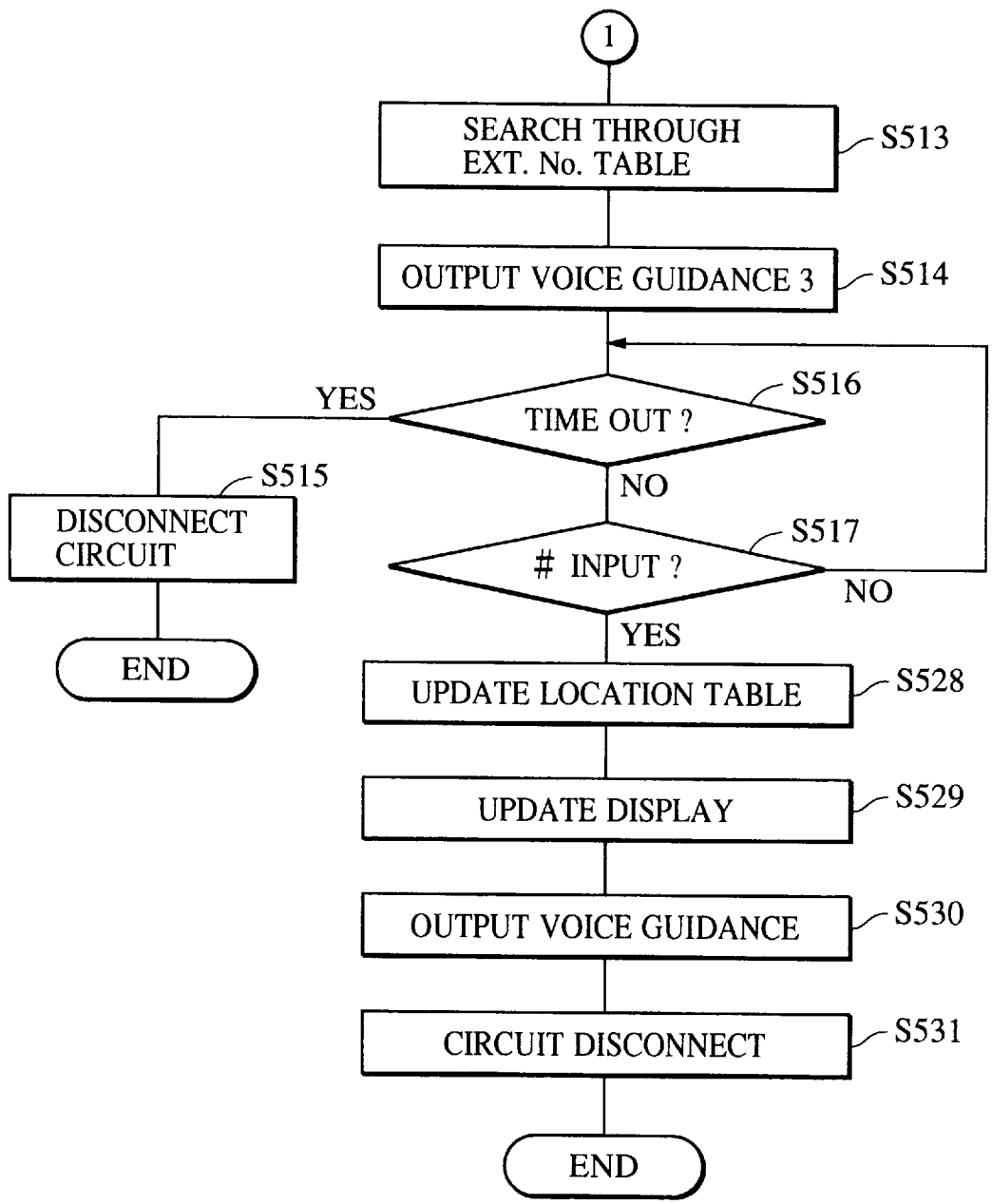
FIG. 8 is a flowchart showing the operation of a second embodiment of the present invention.
Figure 9:
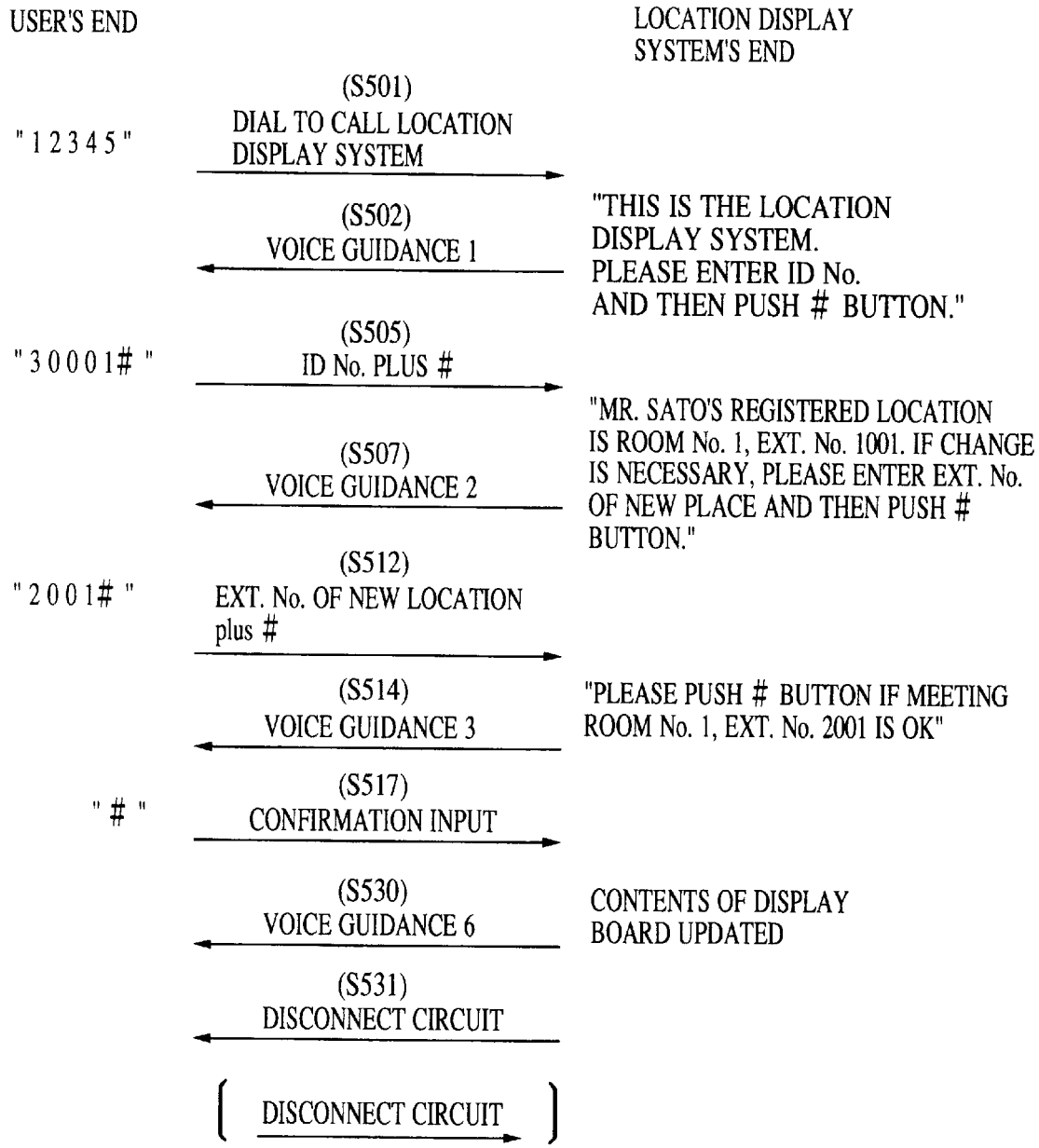
FIG. 9 is a sequence chart illustrative of the operation of the second embodiment.

In this embodiment, a user can change his registered location by using a telephone capable of transmitting DTMF signals or a tone dialer, in accordance with a procedure which will be described with reference to FIGS. 8 and 9.

The steps of the process down to S517 is the same as that explained before in connection with FIGS. 4A and 4B. Steps 528 onwards also are the same as those explained in connection with FIG. 4B. Thus, the operation described before by making reference to FIG. 4A is executed in exactly the same manner in this embodiment.

The user, Mr. SATO, enters his own ID No. 30001, followed by input of the end code through the sharp (#) key, by using the above-mentioned telephone or tone dialer mentioned above. FIG. 9 shows the process which is executed when there is no message.

The CPU 101 operates, in response to the input (S517) through the sharp (#) key, so as to update the location table from the state shown in FIG. 3A to the state shown in FIG. 3C (S528). It will be seen that the location of Mr. SATO is changed from ROOM No. 1, Extension No. 1001 to MEETING ROOM No. 1, Extension No. 2001. Corresponding updating is effected on the display section 104 (S529).

A voice guidance 6 is then transmitted (S530). The content of this voice guidance is, for example, "CONTENTS OF DISPLAY BOARD UPDATED.". Then, the circuit 110 is disconnected, so that the processing is terminated. The user then hooks the telephone on, whereby the whole process for updating the location display board is completed.

Figure 10:
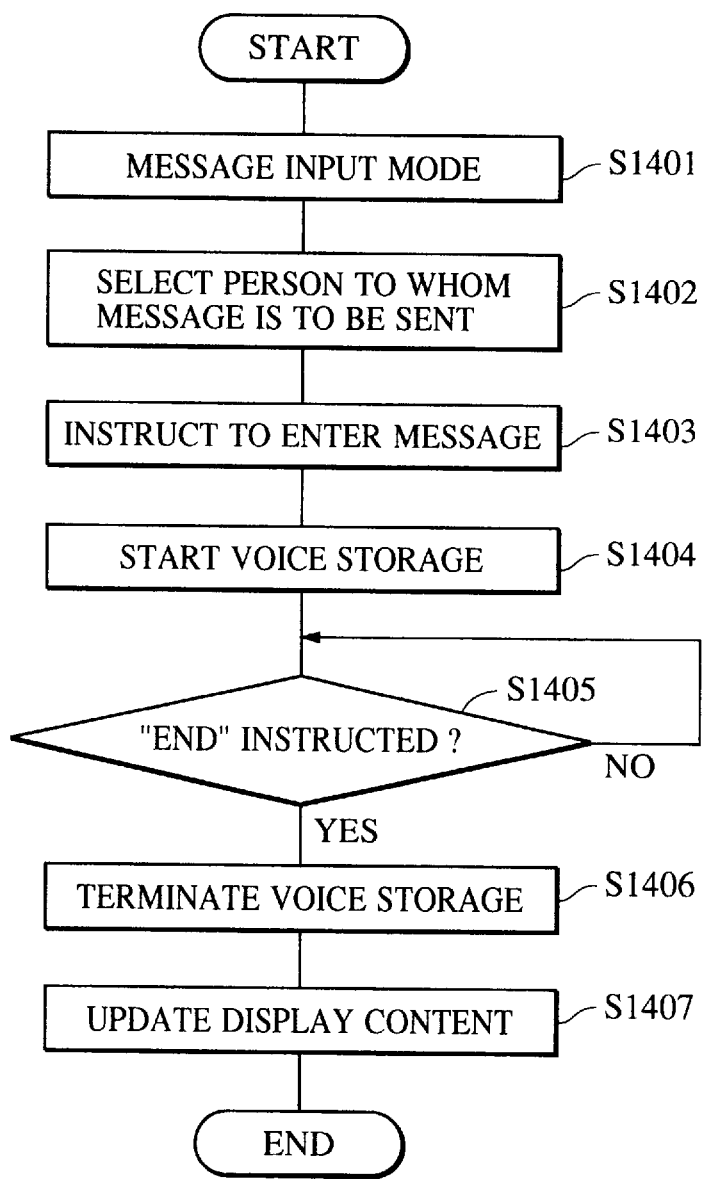
FIG. 10 is a flowchart showing the operation of the second embodiment.

A description will now be given of a process for accumulating voice messages in the apparatus of this embodiment, with specific reference to FIG. 10.

The user switches the operation mode of the apparatus to a message accumulation mode through the operating section 912 (S1401). Then, the user selects the person for whom the message is to be accumulated (S1402), and gives instructions for voice input (S1403). The apparatus then starts the voice pickup section 109 (S1404) so as to execute voice pickup until instructions for terminating the voice pickup are entered (S1405).

The user then speaks to the microphone 1001M of the voice input section 1001 of the apparatus so as to vocally input a massage which is, for example, "PLEASE CALL MR. XXX URGENTLY" (S1406). When the message has been accumulated in the RAM 83 of the voice pickup section 109 (S1406), the apparatus updates the contents of the display section 104 (S1407), thus finishing the operation in the message input mode.

The display section 104 then changes its content from the state shown in FIG. 3C to the state shown in FIG. 3B. It will be seen that the state "NO MESSAGE FOR MR. SATO" (X) is changed to "THERE IS MESSAGE FOR MR. SATO" (o).

Figure 11:
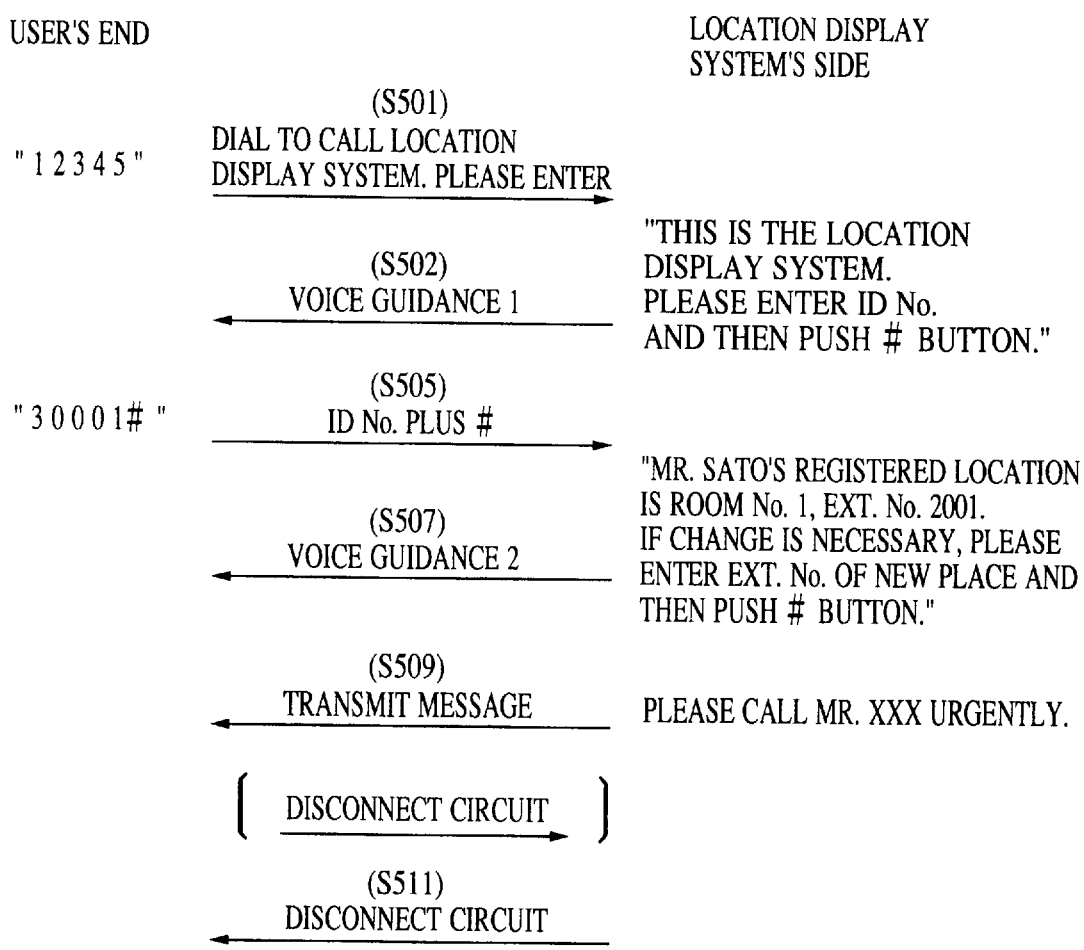
FIG. 11 is a sequence chart explanatory of the operation of the second embodiment.

A description will now be given of a case where a user contacts the location display apparatus through a telephone capable of transmitting DTMF signals or a tone dialer, in order to learn locations and to be informed of the content of messages, with reference to FIG. 4A and FIG. 11.

In response to a call made in Step S501 by Mr. SATO, the user, the CPU 101 operates to deliver a voice guidance 1 (S502) to the user's telephone. Then, the user enters, using the above-mentioned telephone or a tone dialer, the ID No. 30001 of Mr. SATO, followed by input of a code through the sharp (#) button (S505).

When the input is detected, the CPU 101 receives the input signal and acquires, from the table shown in FIG. 3A, the name, phone extension number and location data based on the entered ID number.

The CPU 101 then operates to transmit a voice guidance 2 (S507). The content of the voice guidance 2 is, for example, "MR. SATO'S REGISTERED LOCATION IS ROOM No. 1, EXT. No. 1001. IF CHANGE IS NECESSARY, PLEASE ENTER EXT. No. OF NEW PLACE AND THEN PUSH "#" button.". If any message has been stored in the voice pickup section 109 in Step S508, this message is reproduced following the voice guidance 2 (S509). The message is, for example, "PLEASE CALL MR. XXX URGENTLY.". When no response from the user is detected within a predetermined time (S510), the CPU 101 operates to disconnect the circuit 110 (S511), thus terminating the processing.

It is thus possible to confirm the location of a person and to hear a message which has been input at the place where the location display apparatus is situated, from a remote place by using a telephone capable of transmitting DTMF signals or a tone dialer.

A description will now be given of a third embodiment of the location display apparatus in accordance with the present invention.

Referring to FIG. 7, the voice pickup section 109 employs a voice reproduction processing unit 164 which incorporates a speaker 164S, an amplifier and so forth, so as to amplify the analog voice signal reproduced by the PCM codec.

Figure 12:
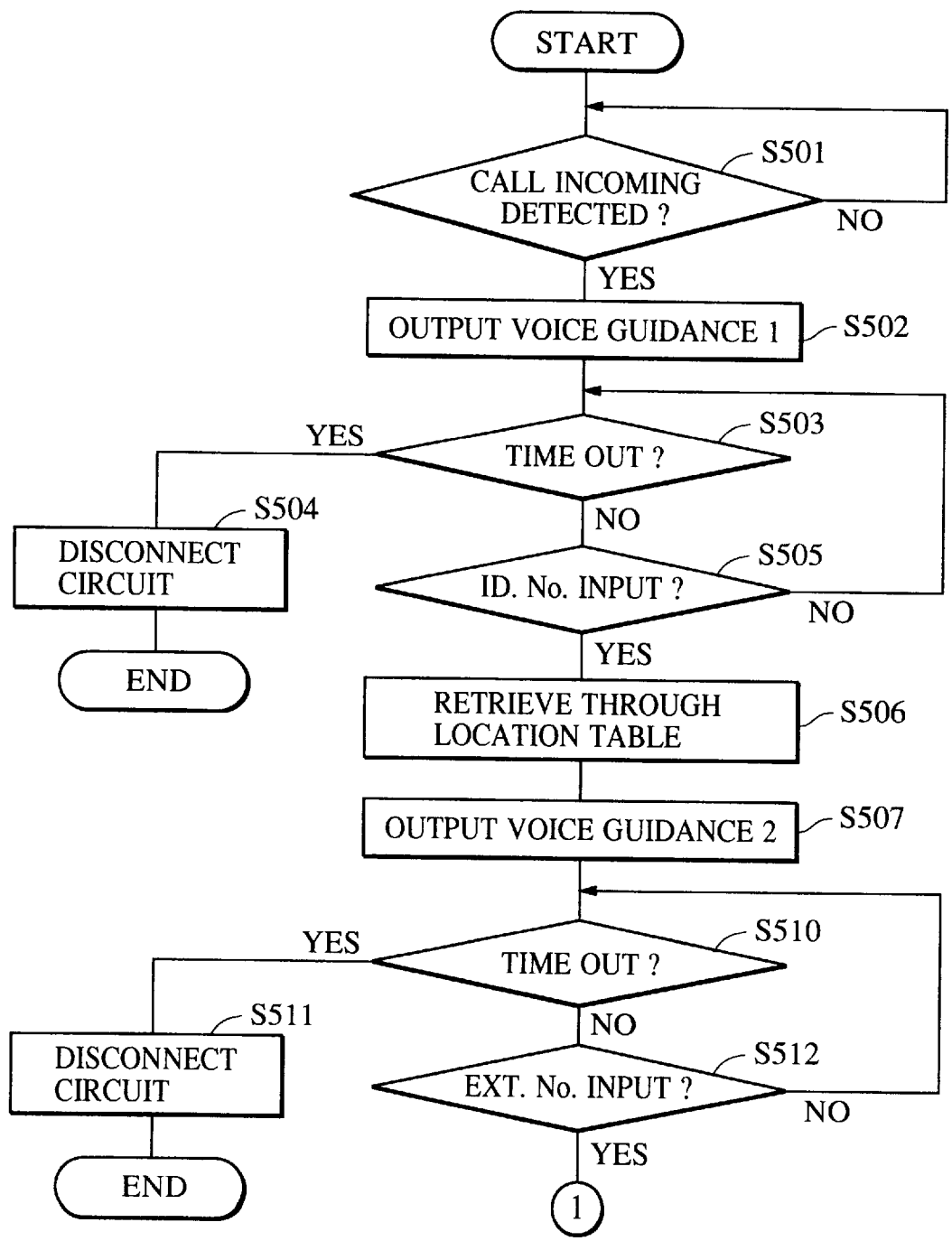
FIG. 12 is a flowchart showing the operation of a third embodiment of the present invention.

The user can change his registered location and accumulate messages by using a telephone capable of outputting DTMF signals or a tone dialer, in accordance with a process which will be described hereinunder with reference to FIG. 12. Steps of this process down to S507 are the same as those explained before in connection with FIG. 4A. Steps S510 onward are also identical to those explained before in connection with FIGS. 4A and 4B. Thus, the operation shown in FIG. 4B is completely executed in this process.

A caller, Mr. SATO, enters his own ID No. 30001 and then inputs an end code through a sharp (#) key, by means of a telephone capable of transmitting DTMF signals or by a tone dialer (S505).

In response to the above, a voice guidance 2 is transmitted (S507) and, thereafter, the CPU 101 waits for further entry of instructions from Mr. SATO. Mr. SATO, if he wishes to change his registered location to meeting room No. 1, enters the phone extension No. 2001, followed by input of an end code through the "#" key, after confirming the location which has been registered and any message directed to him. If no input by Mr. SATO is detected within a predetermined time (S510), the CPU performs an error processing so as to disconnect the circuit 110 (S511), thereby completing the processing.

However, if entry of instructions by Mr. SATO is detected within the time, the CPU 101 executes the steps S513 onwards which are shown in FIG. 4B.

Figure 13:
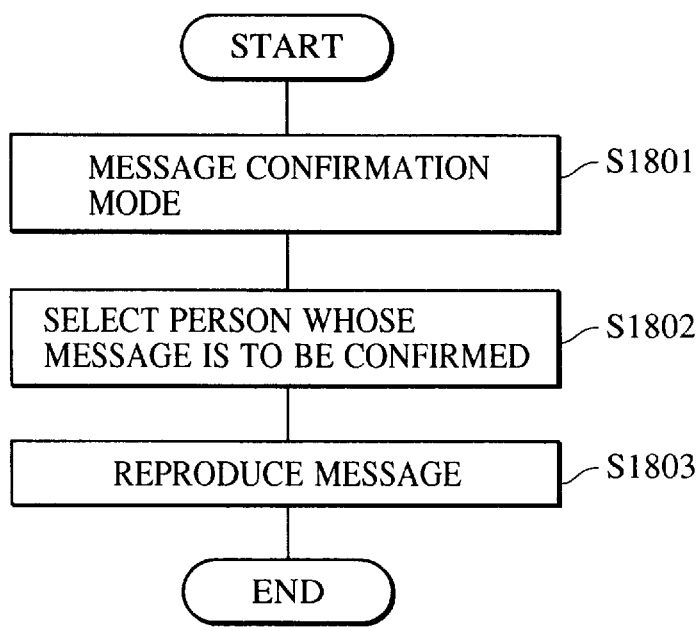
FIG. 13 is a flowchart showing the operation of the third embodiment.

A description will now be given of an operation which is executed when a person wishes to confirm any message of another person at the location where the location display apparatus is situated. FIG. 13 is a flowchart showing the message confirming operation.

The user operates the operating section 912 so as to switch the operation of the apparatus to a message confirmation mode (S1801). Then, the user selects the person whose message is to be confirmed (S1802) and gives instructions to commence reproduction of the message (S1803).

In response to the reproduction instructions, the voice pickup section 109 executes processings such as data expansion, D/A conversion and so forth, so as to enable the voice reproduction processing section 164 to announce the message from its speaker 164S. The content of the message is, for example, "HAVING MEETING WITH MR. XXXX".

It is thus possible to confirm locations and to store messages, from a remote place by means of a telephone capable of transmitting DTMF signals or by means of a tone dialer. In addition, an operator or user who is present at the place where the apparatus is located can confirm the locations of persons registered and to know what they are doing, through confirmation of the messages.

A description will now be given of a fourth embodiment of the location display apparatus in accordance with the present invention.

Figure 14:
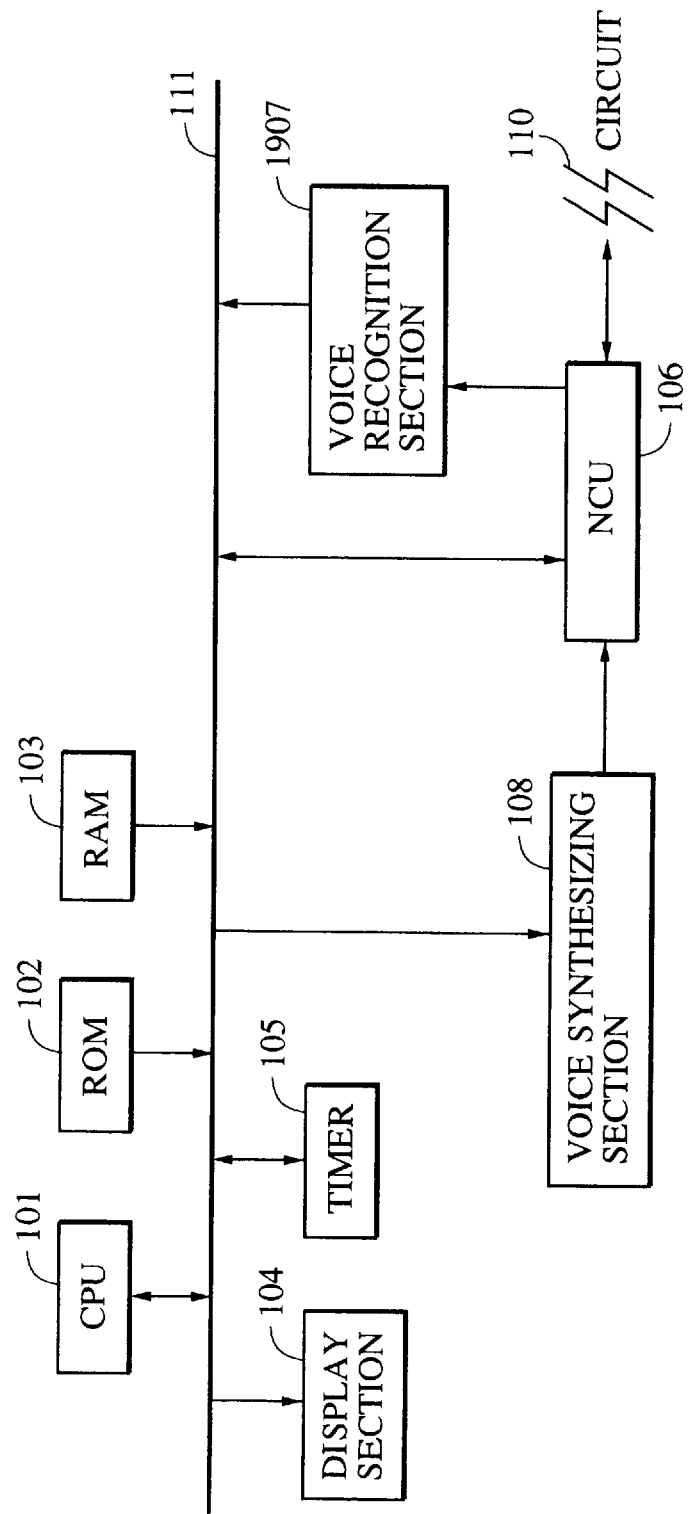
FIG. 14 is a block diagram of a fourth embodiment of the present invention.

FIG. 14 is a block diagram showing the construction of the fourth embodiment. This embodiment employs a voice recognition section 1907 having a voice recognition circuit. Other components of the apparatus are materially the same as those used in the location display apparatus shown in FIG. 1. It will be seen that the fourth embodiment of the location display apparatus of the present invention is formed by substituting the voice recognition section 1907 for the DTMF detecting section 107 and the voice pickup section 109 in the embodiment shown in FIG. 1.

Figure 15A:
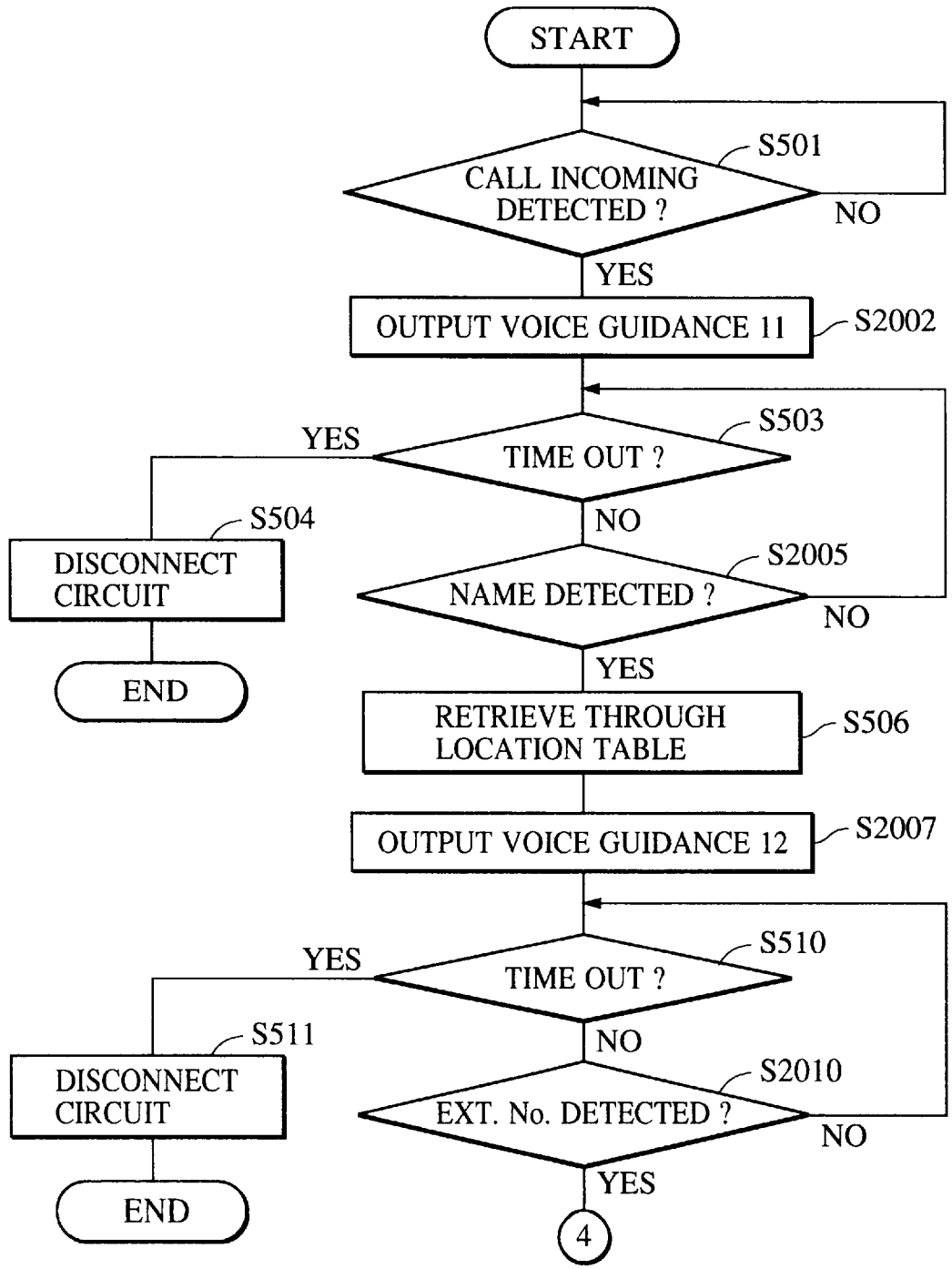

FIGS. 15A and 15B are flowcharts explanatory of the operation of the fourth embodiment, while FIGS. 16A and 16B illustrate tables storing the correlation between the persons registered and their locations. FIG. 17 is a sequence chart explanatory of the process executed by the location display apparatus and the operation of the apparatus conducted through interaction between a user and the system.

A RAM 103 stores the phone extension number table as shown in FIG. 2 and the data stored in the table shown in FIG. 16A indicating the correlation between persons and locations. The CPU administrates the contents of such table and data. The table shown in FIG. 16A is displayed on the display section 104.

A description will now be given of the procedure which is taken when a user wishes to change his registered location and to leave and display a message, by using a telephone which is not shown, with reference to FIGS. 15 to 17.

The CPU 101 monitors the data output from the NCU 106 (S501) and, in response to a call by Mr. SATO, the user, delivers data for voice synthesis to the voice synthesis section 108 through the BUS 111. The synthesized voice data is converted into analog signals and is sent as a voice guidance 11 to the user's telephone via the NCU 106 and the circuit 110 (S2002). The content of the voice guidance 11 is, for example, "THIS IS THE LOCATION DISPLAY SYSTEM. PLEASE SAY YOUR NAME."

The CPU 101 then starts the voice recognition section 1907, thus preparing for receipt of vocal input of the user's name (S2005). The voice recognition circuit 1907 recognizes the voice signals input through the circuit 110, thus detecting the name of the user. The user pronounces his name, e.g., SATO. If no input by the user is detected within a predetermined time (S503), the CPU 101 performs an error processing so as to disconnect the circuit 110 (S504), thus terminating the processing.

When a vocal input by the user is detected, the CPU acquires information including the phone extension number, location and the message storage address, based on the name of the person which has been vocally recognized.

The CPU 101 then transmits a voice guidance 12 through the circuit 10 (S2007). The content of the voice guidance 12 is, for example, "MR. SATO'S REGISTERED LOCATION IS ROOM No. 1, EXT. No. 1001. IF CHANGE IS NECESSARY, PLEASE ENTER EXTENSION No. OF NEW PLACE.".

The CPU 101 then waits for entry of further instructions from the user. Mr. SATO, the user, then pronounces the new phone extension number 2001, followed by pronunciation of "sharp", after confirming the location which has been stored (S2010).

If no input by the user is detected within a predetermined time (S510), the CPU 101 performs an error processing so as to disconnect the circuit 110 (S511), thus terminating the processing.

However, if input by the user is detected through the circuit 110, the CPU 101 acquires position data from the phone extension number table shown in FIG. 2, based on the entered phone extension number (S513). The CPU 101 then transmits a voice guidance 13 through the circuit 110 (S2012). The content of the voice guidance 12 is, for example, "PLEASE SAY "YES" IF MEETING ROOM No. 1, EXT, No. 2001 IS OK.".

The CPU 101 then starts the voice recognition section 1907 so as to wait for the answer from the user (S2015). The voice recognition section 1907 recognizes the voice signal input through the circuit 110, thus detecting the answer from the user. The user pronounces, for example, "YES". If no input by the user is detected within a predetermined time (S516), the CPU 101 performs an error processing so as to disconnect the circuit 110 (S515), thus terminating the processing.

In response to the user's answer confirming the content of the update, the CPU 101 transmits a voice guidance 14 (S2016). The content of the voice guidance 14 is, for example, "ANY MESSAGE?". The CPU 101 thus waits for input of the user's answer. Mr. SATO, if he wishes to leave a message, pronounces "YES". If no input by the user is detected within a predetermined time (S519), the CPU 101 performs an error processing so as to disconnect the circuit 110 (S520), thus terminating the processing.

Upon recognizing the answer "YES", the CPU 101 starts the voice recognition section 1907 again (S2021) so as to recognize the voice data on the circuit 110 and to store the recognized voice data as a message. For instance, Mr. SATO vocally enters a message such as "HAVING MEETING WITH MR. XXXX", through the circuit 110.

The voice recognizing operation of the voice recognition section 1907 continues until an end code is entered (S2022). After completion of the voice recognizing operation (S2023), the CPU 101 operates to transmit a voice guidance 15 (S2024). The content of this voice guidance is, for example, "MESSAGE RECOGNIZED".

Then, the location table is updated from the state shown in FIG. 16A to the state shown in FIG. 16B (S2025). It will be seen that location of Mr. SATO is changed from room No. 1, phone extension No. 1001 to meeting room No. 1, phone extension No. 2001. A change is effected also from "NO MESSAGE" (x) to "HAVING MEETING WITH MR. XXX". The content of the display in the display section 104 also is changed from the state shown in FIG. 16A to the state shown in FIG. 16B.

A voice guidance 6 is then transmitted (S530). The content of the voice guidance 6 is, for example, "CONTENT OF DISPLAY BOARD UPDATED.". The CPU 101 then disconnects the circuit 110, thus finishing the processing. The whole process for updating the content of the location board is completed when the user hooks the telephone on.

It is thus possible to change and confirm locations, from a remote place by using an ordinary telephone, and to display a message transmitted from a remote place on the display section of the location display system.

A description will now be given of a fifth embodiment of the location display apparatus of the present invention. This embodiment features the use of a power supply control section 2409 (see FIG. 1) which performs control of the power supply to the apparatus so as to turn the power supply on and off.

Figure 19:
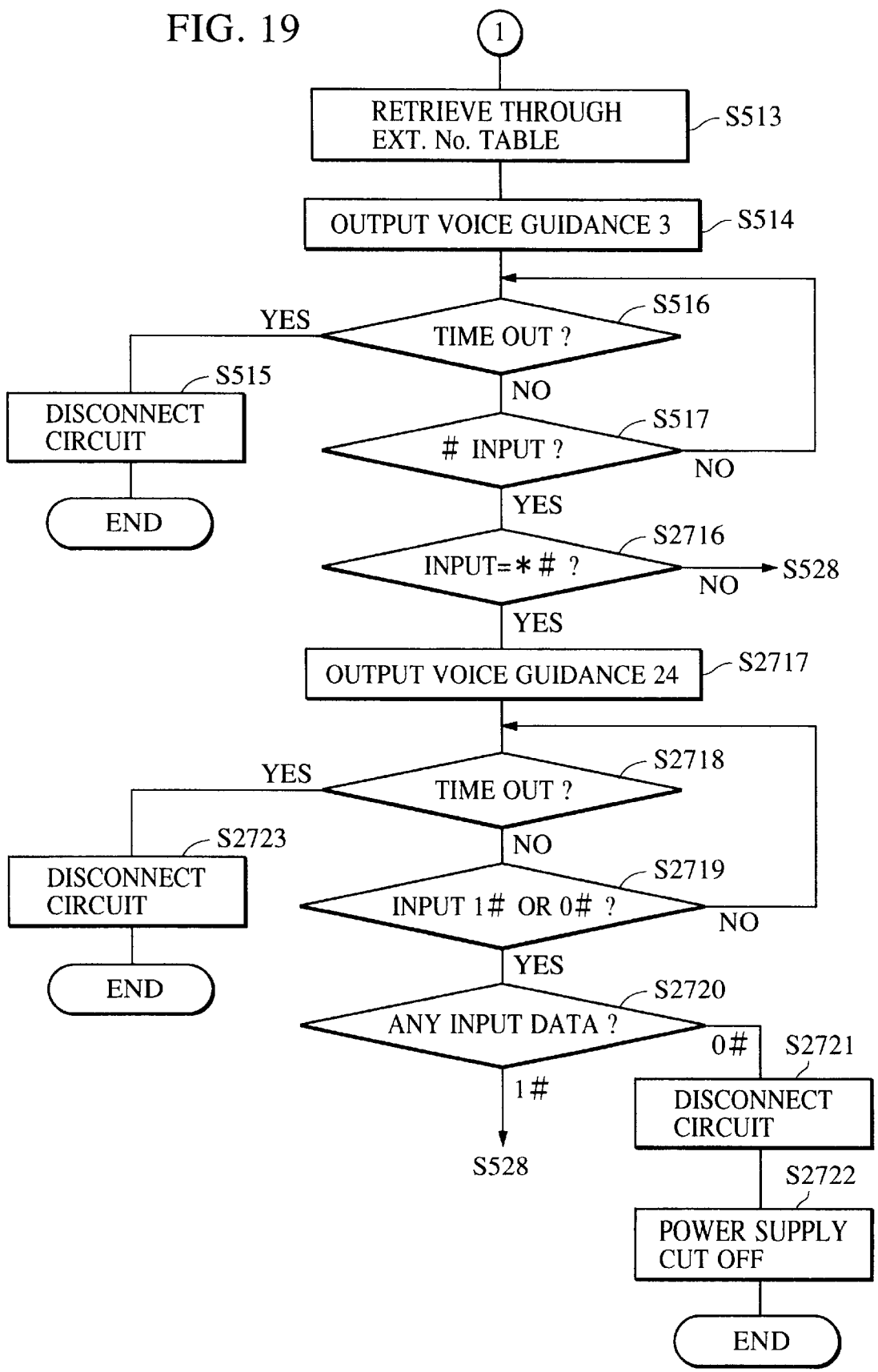
FIG. 19 is a flowchart showing the operation of the fifth embodiment.
Figure 20:
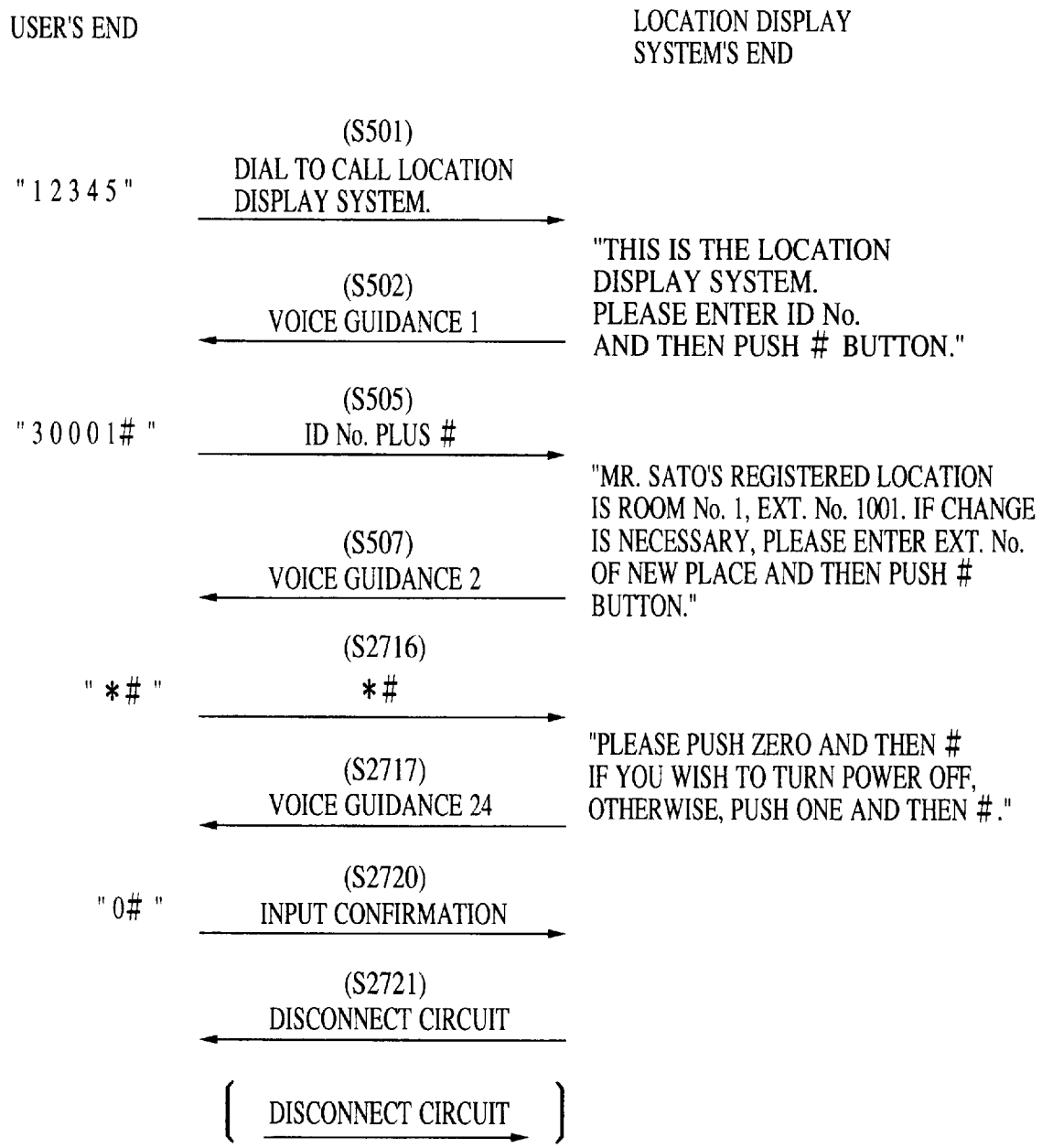
FIG. 20 is a sequence chart explanatory of the operation of the fifth embodiment.

FIGS. 18A and 18B show an example of a location table which stores the names of registered persons in relation to their locations. FIG. 19 is a flowchart showing the operation of the location display system. FIG. 20 is a sequence chart showing the process executed by the location display apparatus and the operation of the same apparatus conducted through interaction with a user.

The phone extension number table shown in FIG. 2 and the data of the table shown in FIG. 18A representing the relationship between the registered persons and their locations are stored in the RAM 103 so as to be administrated by the CPU 101. The display section 104 displays the table shown in FIG. 18A.

A description will now be given of a procedure in accordance with which a user alters his registered location and turns off the power supply, from a remote place by using a telephone capable of outputting DTMF signals or by means of a tone dialer, with specific reference to FIGS. 19 and 20. The process executed in this embodiment employs Steps down to S517 and Steps S528 onwards which are the same as those explained before in connection with FIGS. 12 and 4B.

Mr. SATO, a caller, enters his own ID No. 30001 and end code through the "#" key by using a telephone capable of transmitting DTMF signals or by using a tone dialer. The CPU 101 acquires the name, phone extension number and location data storage address information from the table shown in FIG. 18A, based on the entered ID number.

The user can turn off the power supply to the apparatus after entry of the end code through the sharp (#) key in Step S517, by pushing an asterisk key "*" and then the sharp (#) key. The CPU 101, when it has determined that codes have been entered through the asterisk and sharp keys (S2716), operates so as to transmit a voice guidance 24 (S2717). The content of the voice guidance 24 is, for example, "PLEASE PUSH ZERO AND THEN # IF YOU WISH TO TURN POWER OFF, OTHERWISE, PUSH ONE AND THEN #.".

The CPU 101 turns the power supply off (S2721) upon confirming that "0" and "#" have been entered (S2720). Then, the CPU 101 turns the display off and, after executing various finishing processings, turns off the apparatus power supply by controlling the power supply control section 2409 (S2722). The arrangement may be such that steps S2717 onwards are started when asterisk (*) and sharp (#) are entered as shown in FIG. 20 in place of the phone extension number of the new place and sharp (#) in Step S512.

When the operation for turning the power supply off is not executed, the CPU disconnects the circuit 110 after updating the content of the display section 104 to the new location (S528–S531). For instance, the display shown in FIG. 18A is changed to that shown in FIG. 18B.

As will be understood from the foregoing, the described embodiment makes it possible to change and confirm locations and to turn off the power supply, from a place which is remote from the location display system.

Figure 21:
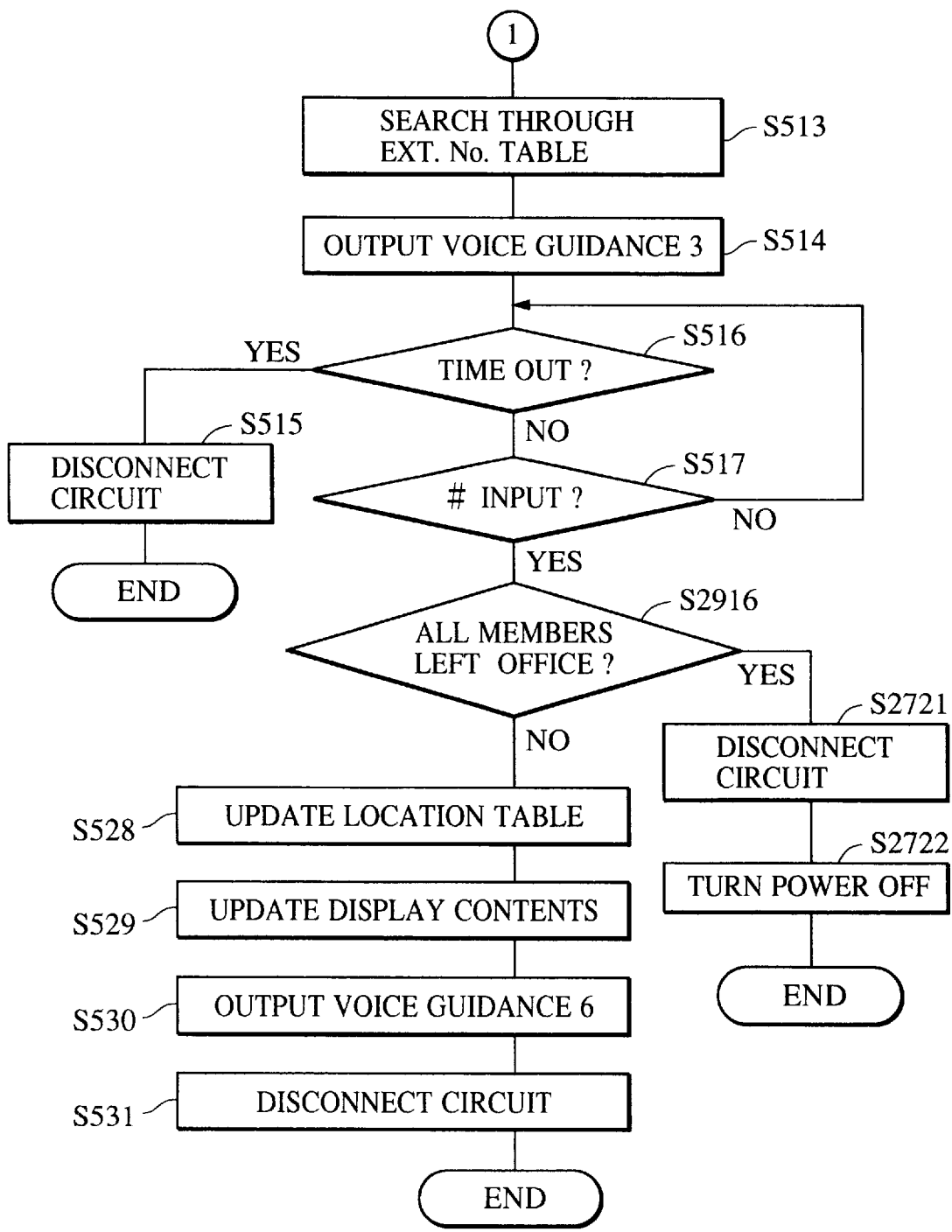
FIG. 21 is a flowchart showing the operation of a sixth embodiment of the present invention.

A description will now be given of a sixth embodiment of the location display apparatus of the present invention. FIG. 21 is a flowchart showing the process executed in the sixth embodiment. This embodiment employs Steps down to S517 and Steps S528 onwards which are the same as those explained before in connection with FIGS. 12 and 4B. The hardware of the apparatus also is the same as that of the fifth embodiment.

The sixth embodiment has the specific function of automatically cutting off the power supply depending on the contents of the location information.

Suppose Mr. SATO, the user, calls the location display system, and enters his own ID number 30001 and sharp (#) code through a telephone capable of transmitting DTMF signals or through a tone dialer. In Step S506, the CPU 101 acquires the name, phone extension number and location data storage address data of the caller, by making a search or retrieval through the table shown in FIG. 18A, based on the entered ID number.

Then, the CPU operates to transmit a voice guidance 2 (S507) and then waits for entry of instructions from the user. Mr. SATO, the user, confirms the registered location and message, if any, and then enters phone extension number 9999, followed by pushing of the sharp (#) key, when he is going to leave the office for home (S512). The four-digit number 9999 has been beforehand determined as being a code indicating that the person who enters this code is going to leave the office for home.

The CPU 101 acquires place data from the phone extension number table of FIG. 2, based on the entered extension number (S513), and then transmits a voice guidance (S514). When the extension number 9999 has been entered, the content of the voice guidance 3 is, for example, "PLEASE PRESS # IF YOU ARE LEAVING OFFICE FOR HOME.". Thus, the CPU waits for entry of confirmation through the sharp (#) key. The user pushes the "#" key if the content of the voice guidance is correct.

The CPU 101 searches for locations of persons registered, after detecting the entry of the confirmation through the sharp (#) key. When all the people have left the office (S2916), the CPU 101 disconnects the circuit (S2721) and turns the display section 104 off. Then, after conducting various finishing processings, the CPU 101 turns the power supply off (S2722).

However, if there is a person or persons who have not yet gone home, the contents of the display section 104 are updated to new locations and, thereafter, the circuit is disconnected (S528–S531). For instance, the content of the display is changed from the state shown in FIG. 18A to the state shown in FIG. 18B.

As will be understood from the foregoing, the described embodiment enables change and confirmation of locations from a remote place, and makes it possible to automatically turn off the power supply depending on the locations of the registered persons. The arrangement, however, may be such that the power supply is turned off when all the registered persons have left the office for business, not home, i.e., when the locations are entered in terms of telephone numbers of a public telephone network, or such that the power is turned off depending on time, e.g., at night, regardless of the locations of the registered persons.

The arrangement shown in FIG. 7 employs a RAM as a medium for storing voice data. This, however, is only illustrative and the voice data storage medium may be constituted by other types of media such as a hard disk.

The voice recognition section 1907 of the block diagram shown in FIG. 14 may be of any level of recognition, regardless of whether the voice is of an identified person or not and whether the pronounced word is a specific word or not, provided that the voice recognition section is capable of performing real-time voice recognition.

The voice recognition, as well as the voice synthesis, may be realized by suitable hardware or software.

In the fourth embodiment as described, the recognized message is displayed on the message recognition section 104. This, however, is only illustrative and the arrangement shown in FIG. 14 may be modified such that the recognized message is vocally announced from the voice synthesis section 108, thus achieving the same advantage as that offered by the first embodiment which has the voice pickup section 109.

It is thus possible to change the content of the display of location information from a remote place, when the user moves from one place to another. In addition, the user can confirm locations of other persons from a remote place, without looking at the "white board".

Furthermore, the described embodiments enable the addition of functions such as storage of voice messages, as well as confirmation of the same, and enable the display apparatus to be remotely operated even from a telephone which does not have the function to output DTMF signals. It is also possible to change a voice message into a text message which is visibly displayed.

The sixth embodiment enables remote operation of the power supply to the location display apparatus and to automatically control the power supply in accordance with location information of the registered persons.

Figure 22:
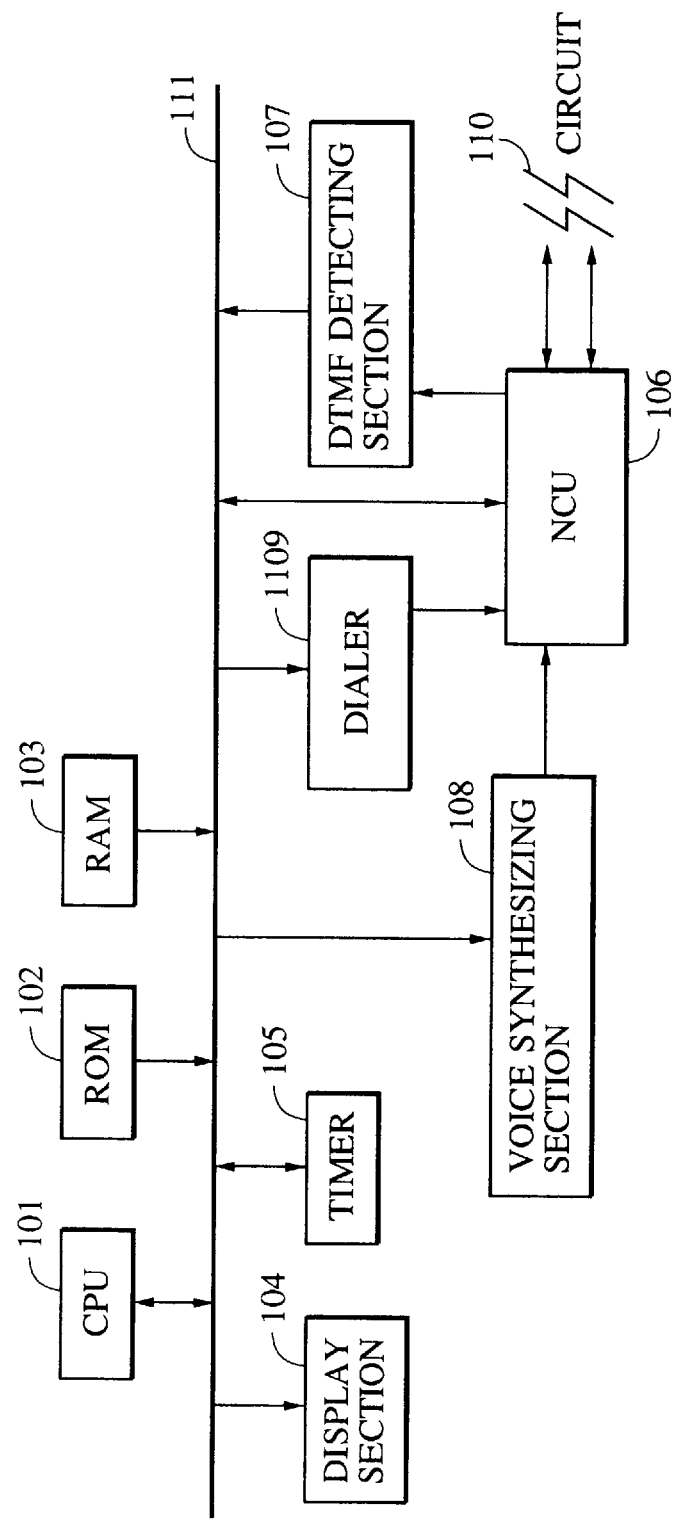
FIG. 22 is a block diagram of a seventh embodiment of the present invention.

FIG. 22 is a block diagram showing the circuitry of a seventh embodiment of the location display apparatus in accordance with the present invention.

This embodiment employs a dialer 1109 that is a kind of tone signal generating device capable of performing dialing of telephone numbers which indicate the locations of a person. The basic construction of this embodiment is materially the same as that of the location display apparatus described before in connection with FIG. 1.

FIGS. 23A and 23B show an example of a table which stores the relationship between registered persons and their locations.

Figure 24A:
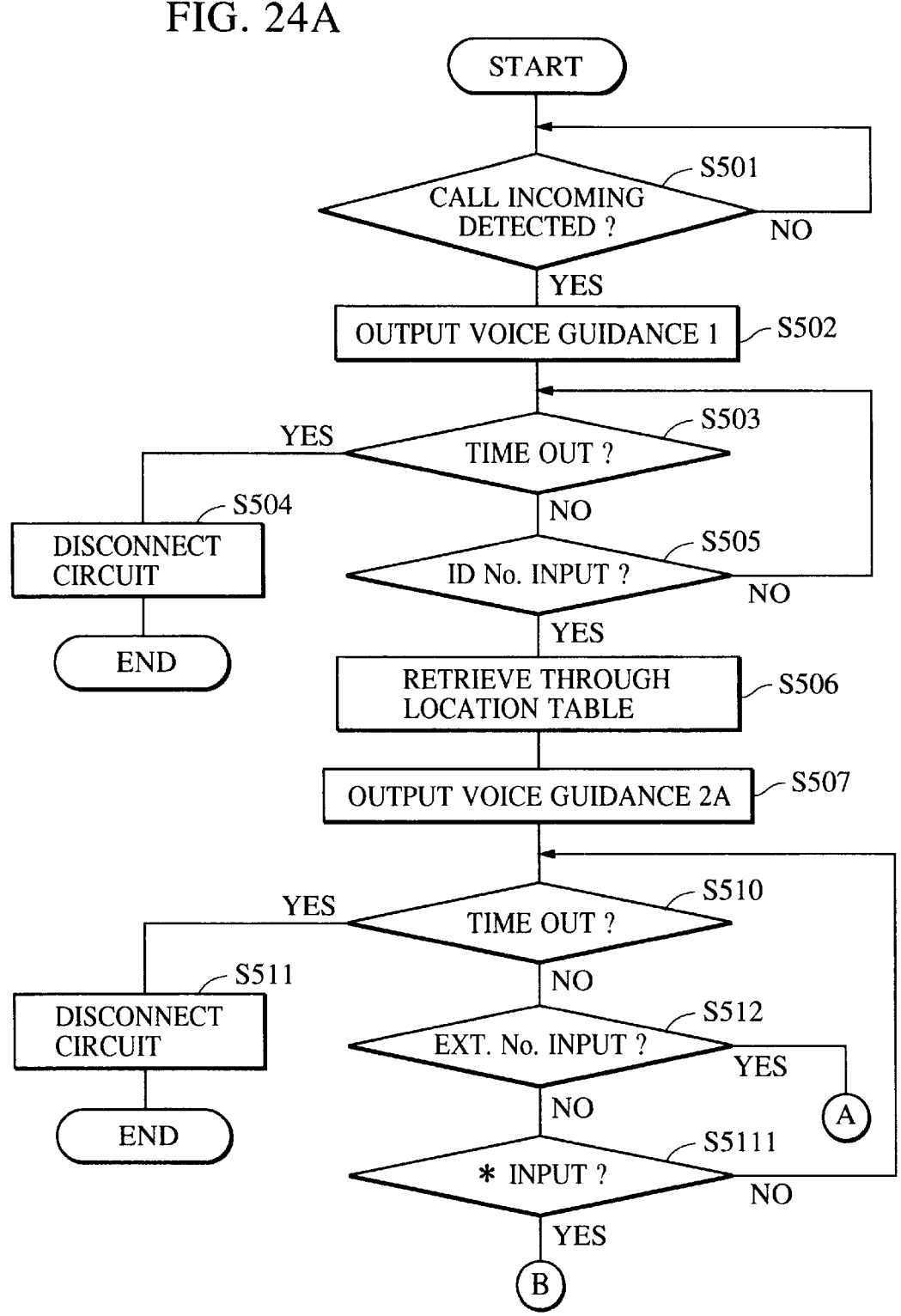
FIGS. 24A to 24C show a flowchart showing the operation of a seventh embodiment of the present invention.
Figure 24B:
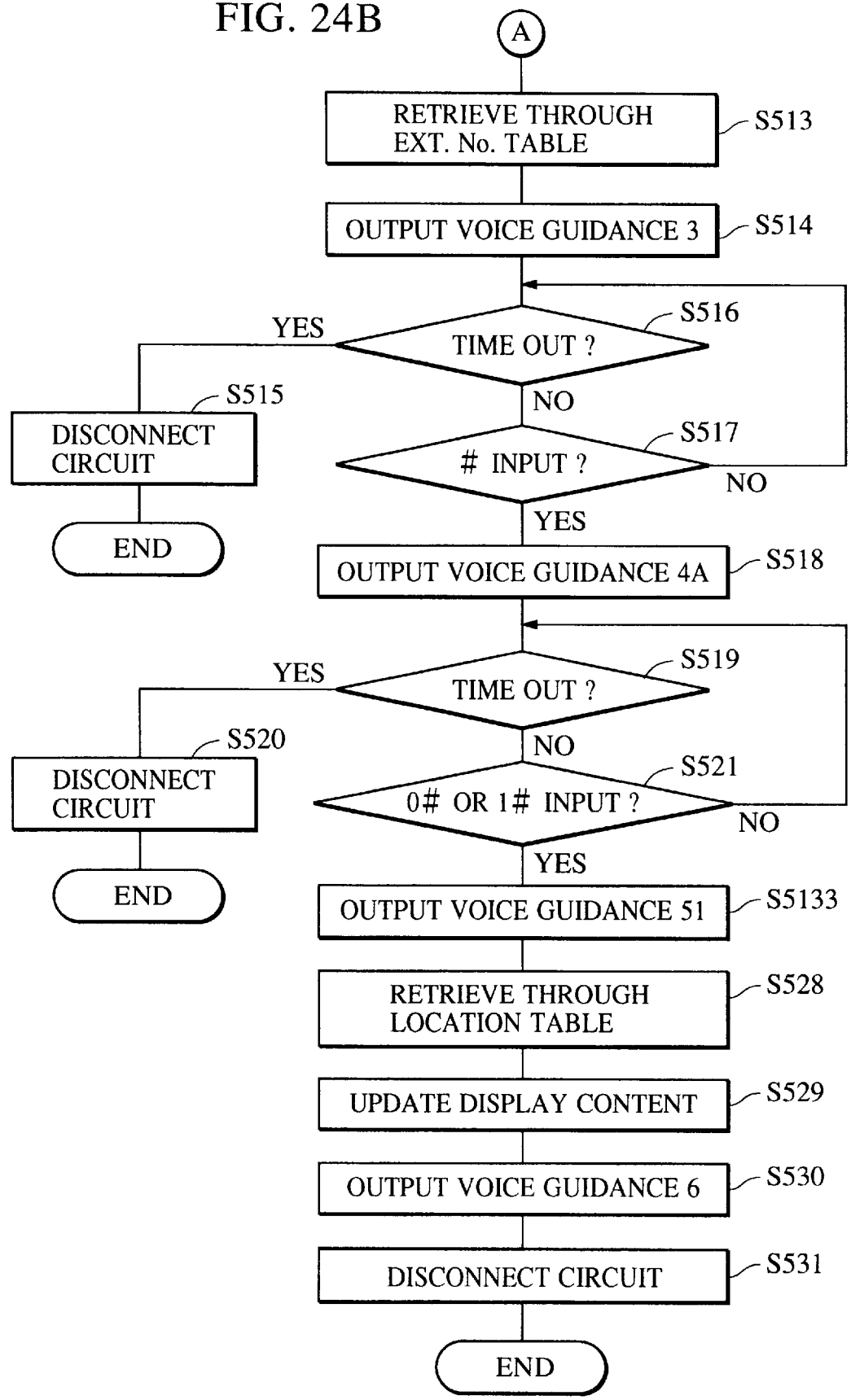
Figure 24C:
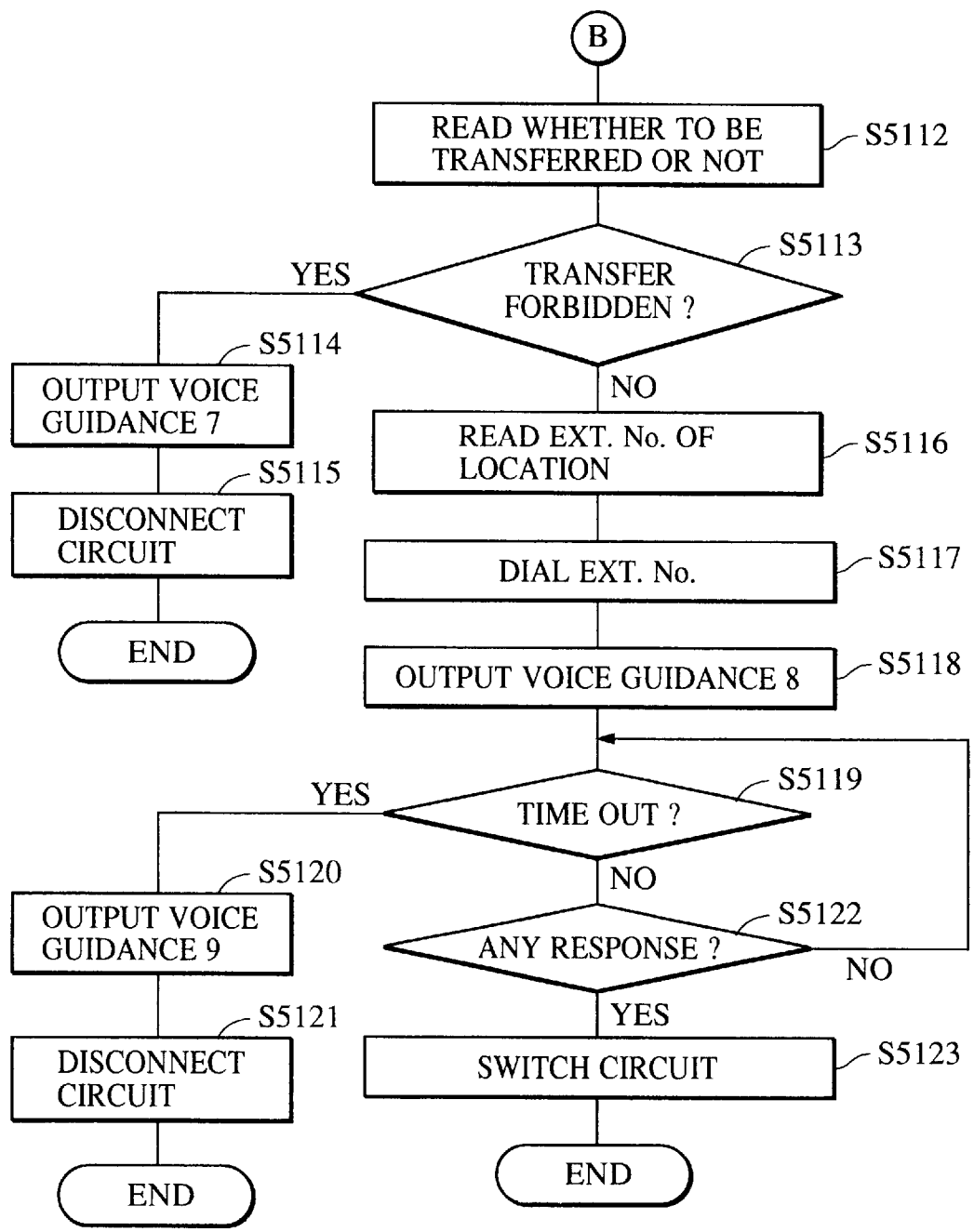
Figure 26:
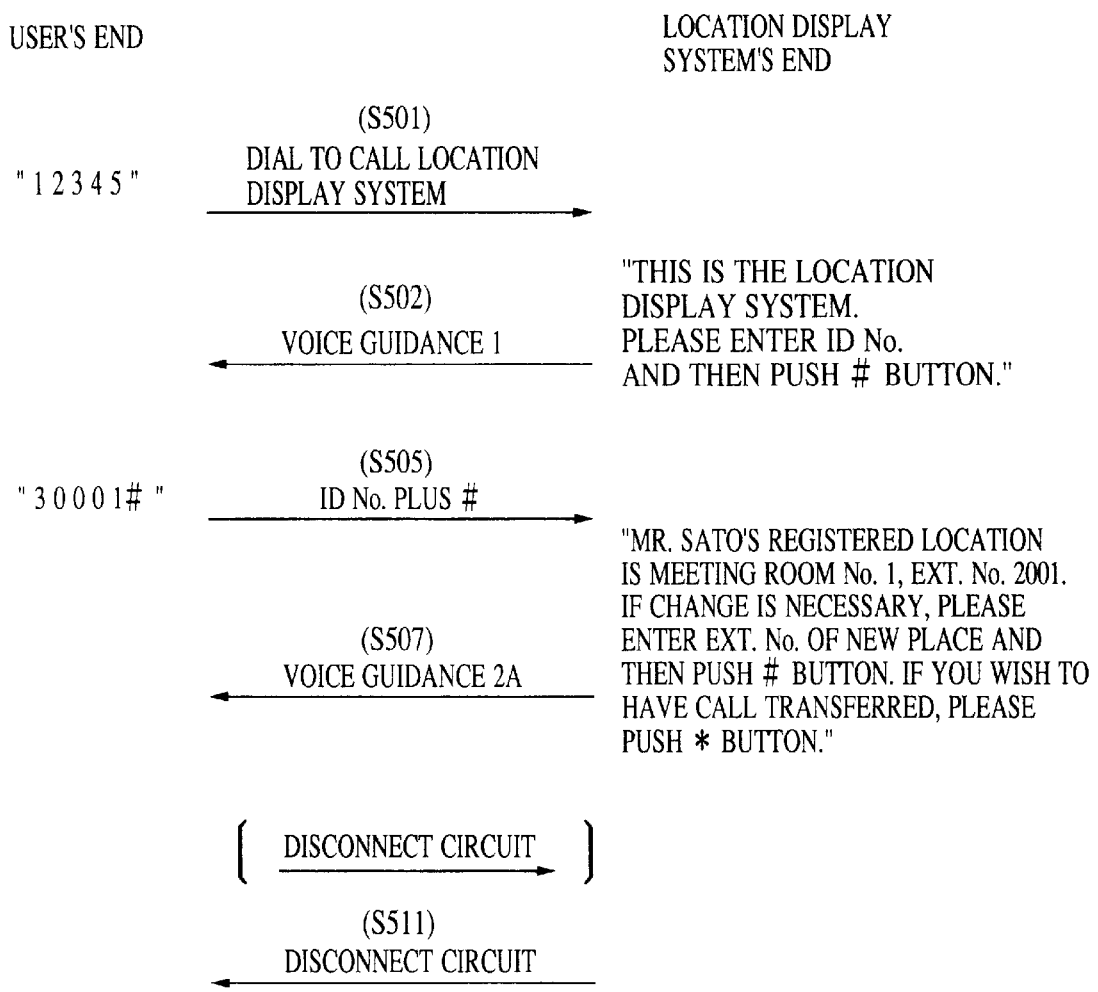

FIGS. 24A to 24C are flowcharts showing an example of the operation performed by the seventh embodiment of the location display system, while FIGS. 25 to 29 are sequence charts explanatory of the operation performed by the location display apparatus through interaction with a user.

The phone extension number table shown in FIG. 23A and the location table shown in FIG. 3 containing relationships between the registered persons and their locations are stored in a RAM 103 so as to be administrated by the CPU 101.

A user can change his registered location by using a telephone capable of transmitting DTMF signals or a tone dialer in accordance with a procedure which will be described hereinunder with reference to FIGS. 24 to 25. The process executed in this embodiment employs Steps S501 to S521 which are the same as those explained before in connection with FIGS. 12 and 4B.

In Step S505, Mr. SATO, a user, enters his own ID No. 30001, followed by input of a code through a sharp (#) key of the above-mentioned telephone or tone dialer.

In this embodiment, the CPU 101 operates to transmit, in response to the entry of the ID. number by Mr. SATO, a voice guidance 2A which is, for example, 'MR. SATO'S REGISTERED LOCATION IS ROOM No. 1, EXT. No. 1001. IF CHANGE IS NECESSARY, PLEASE ENTER EXT. No. OF NEW PLACE. IF YOU WISH TO HAVE CALL TRANSFERRED, PLEASE PUSH * BUTTON.".

In Step S512, Mr. SATO enters the phone extension number 2001 and then pushes the sharp (#) key, if he wishes to change his registered location from room No. 1 to meeting room No. 1.

In Step S518, the CPU 101 operates to transmit a voice guidance 4A. The content of this guidance is, for example, "PLEASE PUSH "1" AND THEN "#" IF YOU PERMIT TRANSFER, IF NOT, PUSH "0" AND THEN "#".". The CPU 101 then waits for instructions from Mr. SATO. If Mr. SATO wishes to concentrate on the meeting and therefore not to be disturbed, he enters codes using the "0" and sharp (#) buttons (S521).

The CPU 101 then transmits a voice guidance 51 in accordance with the instructions given by Mr. SATO (S5133). The content of the voice guidance is, for example, "TRANSFER NOT PERMITTED.". Then, the content of the location table is updated from the state shown in FIG. 23A to the state shown in FIG. 23B (S528). It will be seen that Mr. SATO's location is changed from room No. 1, phone extension number 1001 to meeting room No. 1, phone extension number 2001. The transfer mode also is changed from PERMITTED (o) to NOT PERMITTED (x).

The contents of the display on the display section 104 are updated in accordance with the update of the location table (S529). Then, a voice guidance 6 is transmitted (S530). The content of this guidance is, for example, "CONTENTS OF DISPLAY BOARD UPDATED.". The CPU 101 then disconnects the circuit 110 to terminate the processing. The whole process for updating the location display board is completed when the user hooks the telephone on.

The user therefore can change his registered location from a place remote from the location display system, by using a telephone capable of transmitting DTMF signals or a tone dialer.

A description will now be given of the case in which a user, Mr. SUZUKI, makes an access to the location display apparatus of this embodiment through a telephone capable of outputting DTMF signals or a tone dialer, in order to learn the location of another person, with reference to FIGS. 24 and 26.

Steps of the process down to S507 are the same as those in the process described before in which Mr. SATO makes an access to the apparatus in order to know his own registered location.

In Step S505, Mr. SUZUKI, the user, enters the ID number of Mr. SATO, followed by input of a code through the sharp (#) key, using the above-mentioned telephone or tone dialer.

In Step S510, the CPU waits for further instructions from the user. The user, Mr. SUZUKI, however, does not respond because he now knows the location of Mr. SATO, and hooks the telephone on so as to disconnect the circuit 110. In this case, since no response input from the user is detected within a predetermined time (S510), the CPU 101 operates to disconnect the circuit 110, thus completing the processing.

The user can therefore confirm the location of another person, from a remote place by using a telephone capable of outputting DTMF signals or a tone dialer.

Figure 27:
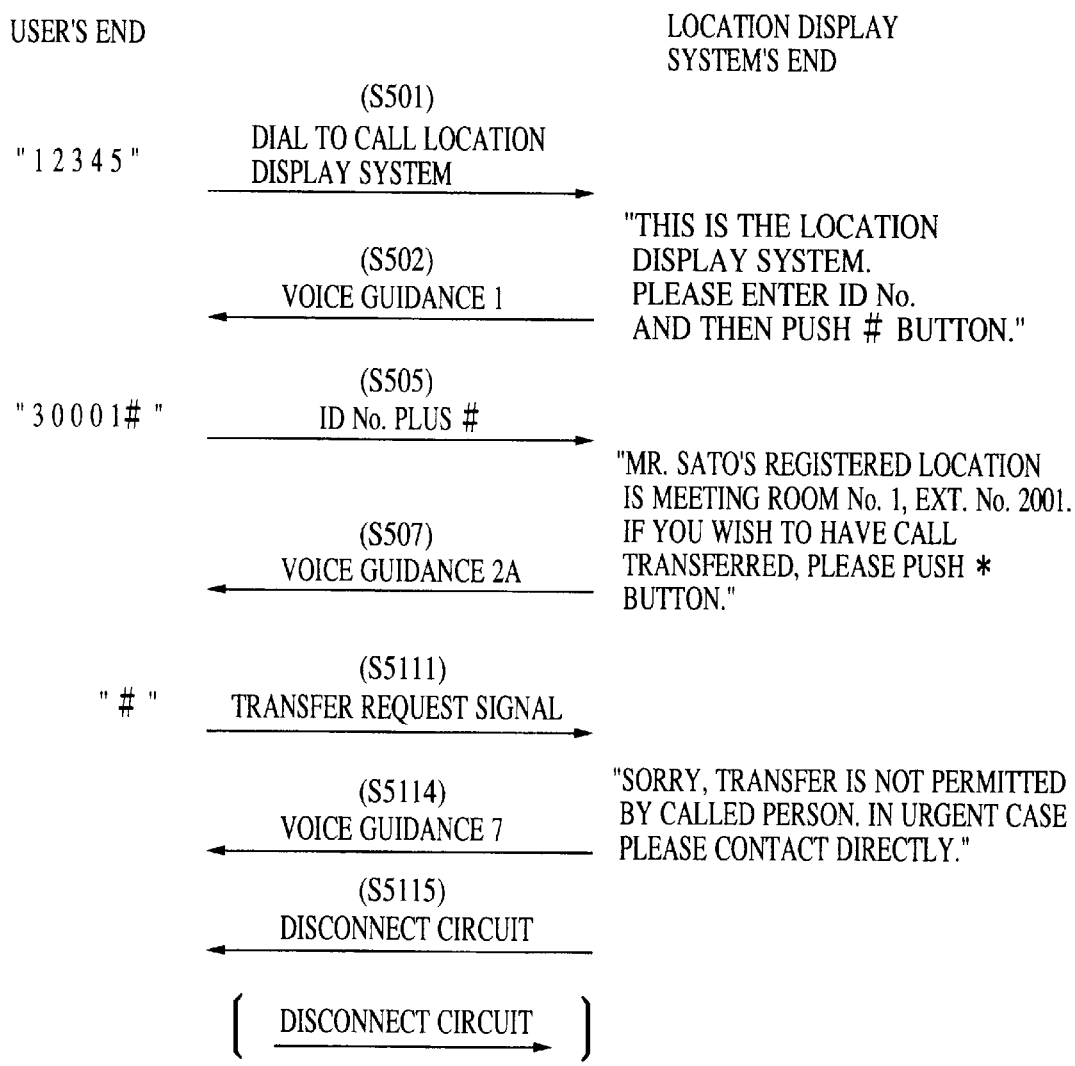

A description will now be given of a process which is executed when a user, i.e., a caller, attempts to have his call transferred to a registered location of a person who does not wish to receive such a transferred call, with reference to FIGS. 24 and 27.

Steps of the process down to S507 are the same as those in the process described before in which Mr. SATO makes an access to the apparatus in order to know his own registered location.

In Step S505, Mr. SUZUKI, the user, enters the ID number of Mr. SATO, followed by input of a code through the sharp (#) key, using the above-mentioned telephone or tone dialer.

In Step S510, the CPU waits for entry of further instructions from the user. In this case, Mr. SUZUKI, the user, enters a request for transfer by pushing the asterisk (*) key, since he would like to get in touch with Mr. SATO (S511).

The CPU 101 confirms the entry of the request for transfer through the asterisk key (*) and reads the registered transfer mode from the location table shown in FIG. 23B (S5112). In this case, the transfer mode is NOT PERMITTED (S5113), so that a voice guidance 7 is transmitted stating, for example, "SORRY, TRANSFER IS NOT PERMITTED BY CALLED PERSON. IN URGENT CASE PLEASE CONTACT DIRECTLY.".

The CPU then disconnects the circuit 110 (S5115), thus terminating the processing. The process attempting transfer of call to a person who does not wish to have such a transferred call is thus completed.

The user can therefore confirm the location of another person and understand that the person does not wish to be disturbed by a phone call, from a place remote from the apparatus by using a telephone capable of outputting DTMF signals or a tone dialer.

Figure 28:
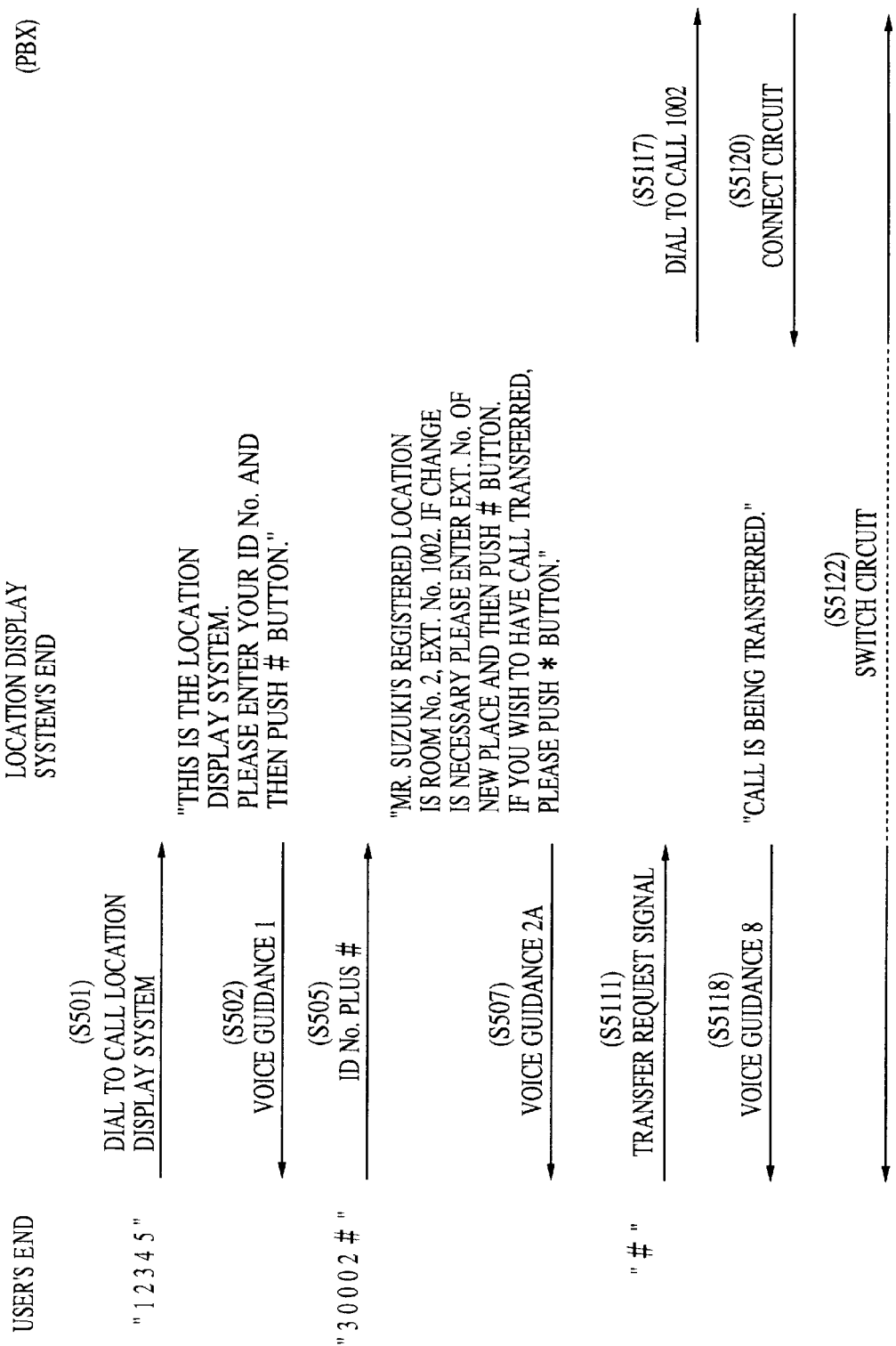

A description will now be given of a process which is executed when a user, i.e., a caller, attempts to have his call transferred to a registered location of a person who is permitting such a call transfer, with reference to FIGS. 24 and 28.

In this case, the caller is Mr.SATO who wishes to contact Mr. SUZUKI. Steps of the process down to S5112 are the same as those in the process described before in which Mr. SUZUKI makes an access to the apparatus in order to get in touch with Mr. SATO.

In Step S505, Mr. SATO, the user, enters the ID number of Mr. SUZUKI, followed by input of a confirmation code through the sharp (#) key, using the above-mentioned telephone or tone dialer.

In this case, Mr. SATO, the user, enters the request for transfer by pushing the asterisk (*) key, since he would like to get in touch with Mr. SUZUKI (S511).

The CPU 101 confirms the entry of the request for transfer through the asterisk key (*) and reads the registered transfer mode from the location table shown in FIG. 23B (S5112). In this case, the transfer mode is PERMITTED (S5113), so that the CPU reads the phone extension number of the location of Mr. SUZUKI from the same table (S5116) and, while holding the incoming call from Mr. SATO, dials the phone extension number thus read from the table, via the NCU 106 and the PBX (S5117). At the same time, a voice guidance 8 is transmitted stating, for example, "CALL IS BEING TRANSFERRED".

When a response from the called extension number is detected within a predetermined time, the CPU 101 operates to switch the NCU 106 so as to connect the telephone of the caller, Mr. SATO, to the telephone of the place where the called person, Mr. SUZUKI, is available (in this case, Mr. SUZUKI is in room No. 2), thus terminating the process (S5123). The arrangement may also be such that the incoming call can be transferred not only to the PBX extensions but also to an external line.

The user can thus confirm the location of another person and transfer his call from the location display apparatus to the place of such a person, from a remote place by using a telephone capable of transmitting DTMF signals or a tone dialer.

Figure 29:
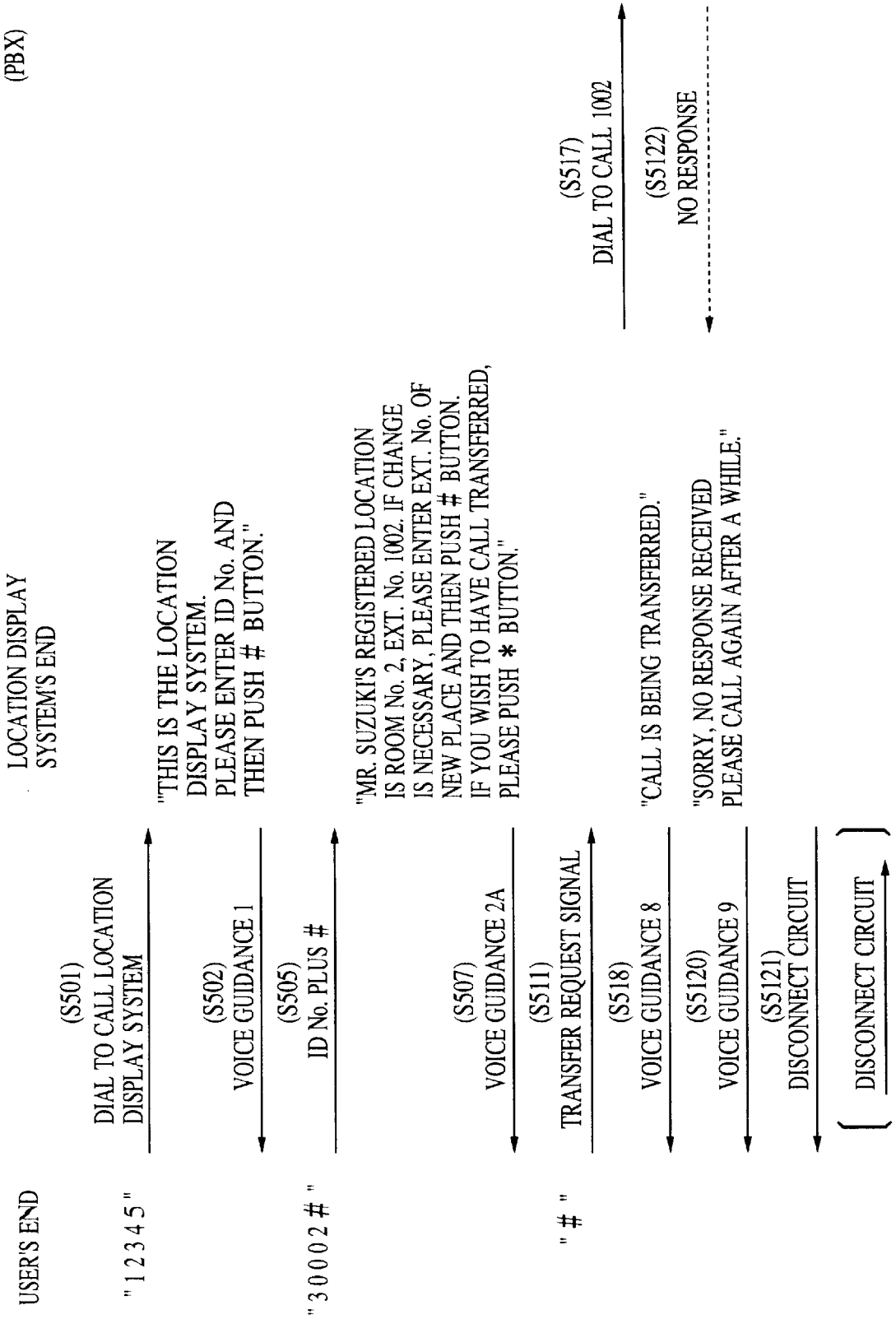

With reference to FIGS. 24 and 29, a description will now be given of a case where a user has gotten in touch with the location display apparatus by a telephone capable of transmitting DTMF signals or a tone dialer and has requested a transfer to a person who permits such a transfer, but no response could be obtained from such a person despite the transfer.

In Step S5119, when no response could be obtained within the predetermined time, dialing to Mr. SUZUKI is terminated and a voice guidance 9 is transmitted (S5120) stating "SORRY NO RESPONSE RECEIVED. PLEASE CALL AGAIN AFTER A WHILE.". The CPU 101 then disconnects the circuit 110 connected to Mr. SATO (S5521), thus terminating the processing. The whole process executed when no answer could be obtained from the called person who permits transfer of call, possibly due to the absence of the person, is thus completed.

Thus, the user at a place remote from the location display apparatus can confirm the location of another person and have his call transferred to the current registered location of such a person, finding that he is not available there, by means of a telephone capable of transmitting DTMF signals or a tone dialer.

A description will now be given of an eighth embodiment of the location display table in accordance with the present invention.

Figure 30:
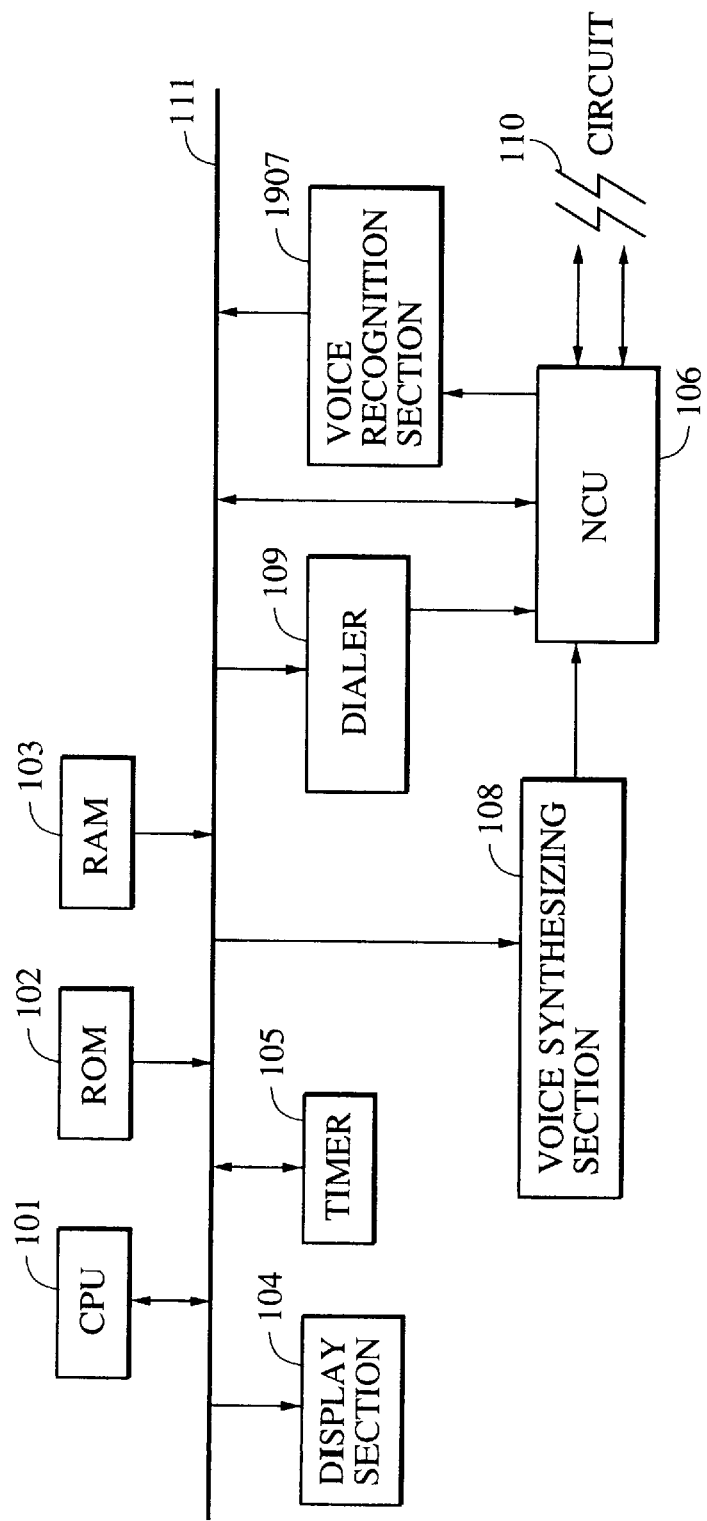
FIG. 30 is a block diagram of an eighth embodiment of the present invention.

FIG. 30 is a block diagram showing the construction of the circuitry of the eighth embodiment.

This embodiment is similar to the seventh embodiment described before in connection with FIG. 22 but is different in that it uses, in place of the DTMF detecting section 107 in the seventh embodiment, a voice recognition section 1907 which recognizes the voice received through the circuit 110. Other portions are materially the same as those of the seventh embodiment shown in FIG. 22 and, hence, are not described in detail.

The phone extension number table shown in FIG. 2 and the location table shown in FIGS. 23A and 23B, used in the seventh embodiment, are used also in the eighth embodiment.

Figure 31A:
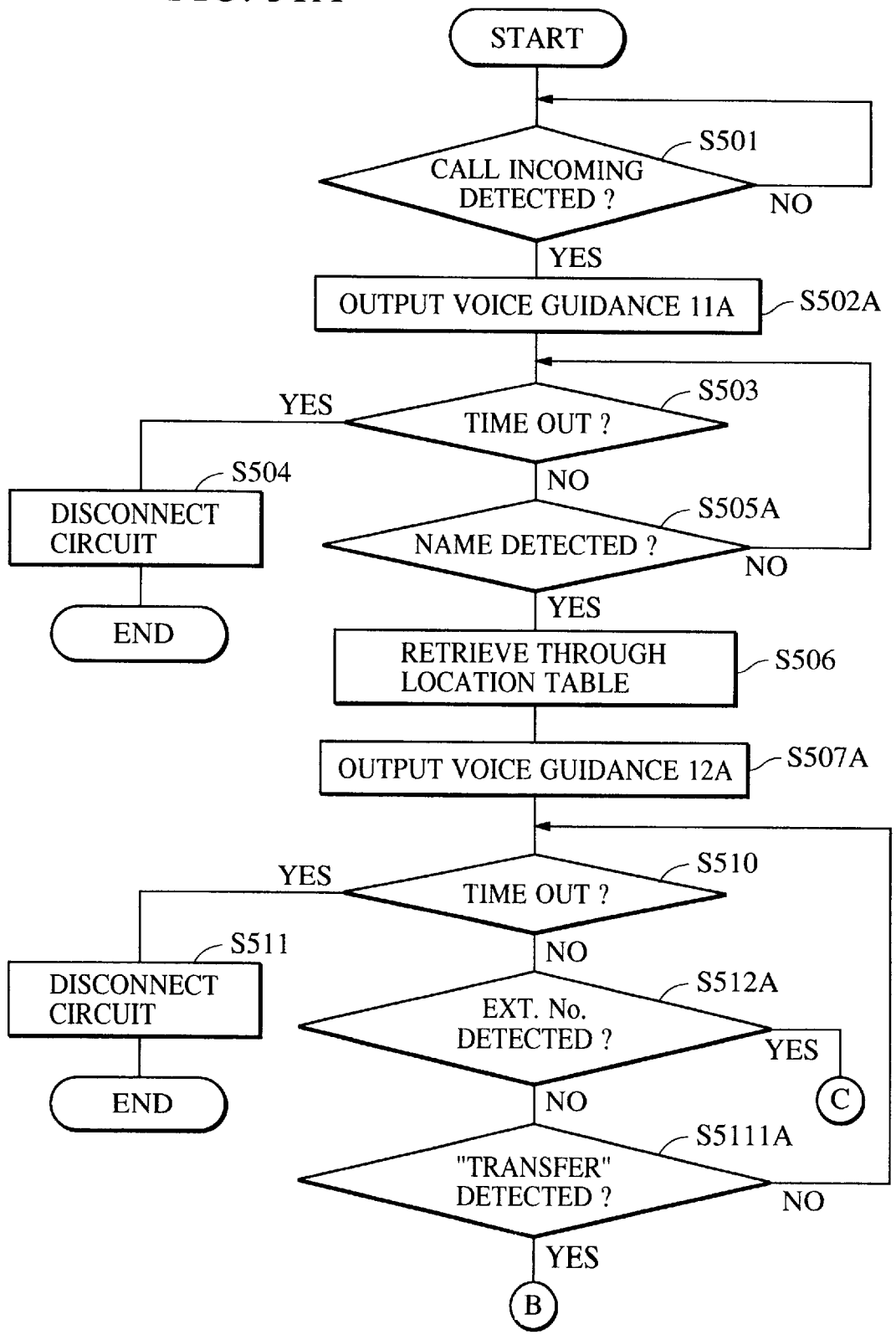
FIGS. 31A and 31B form a flowchart showing the operation of the eighth embodiment.
Figure 31B:
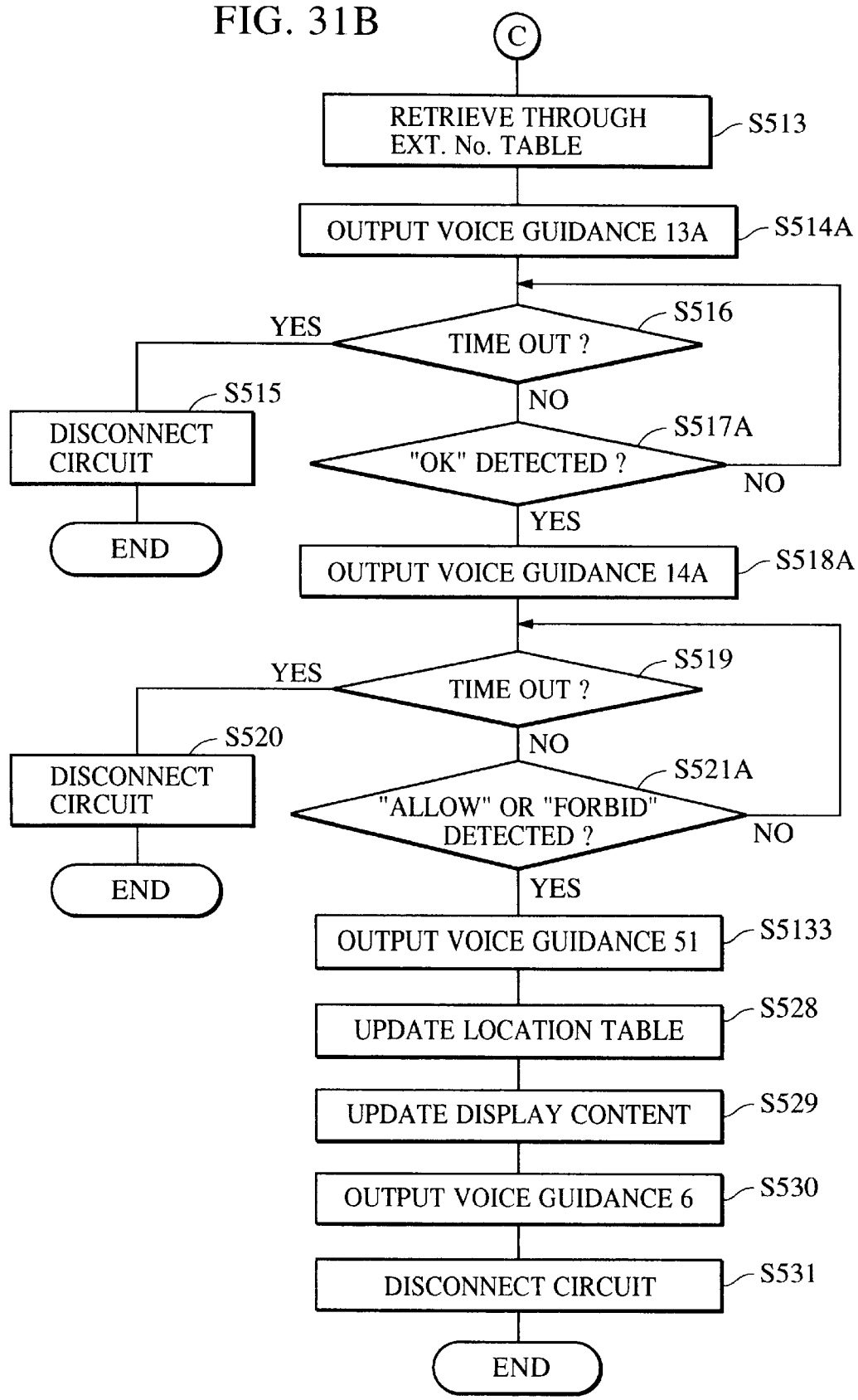

FIGS. 31A and 31B show a flowchart illustrative of the operation of the eighth embodiment of the location display system. Since a voice recognition function is used in place of the DTMF detecting function used in the seventh embodiment, corresponding changes are effected also on the contents of messages.

The CPU 101 executes Steps S5112 onwards, when it has detected "TRANSFER" in Step S511A. The CPU 101 administrates the phone extension number table of FIG. 2 and the location table of FIG. 23A which are stored in the RAM 103. The display section 104 displays the contents of the table shown in FIG. 23A.

The content of the voice guidance 11A is, for example, "THIS IS THE LOCATION DISPLAY SYSTEM. PLEASE SAY YOUR NAME.". In Step S505A, the user pronounces his name, e.g., "SATO" or "SUZUKI".

The content of a voice guidance delivered in Step S507A is, for example, "MR. SATO'S REGISTERED LOCATION IS ROOM No. 1, EXT. No. 1001. IF CHANGE IS NECESSARY, PLEASE SAY EXT. No. OF THE NW PLACE. IF YOU REQUEST TRANSFER OF CALL, PLEASE SAY "TRANSFER".".

If the user, Mr. SATO for example, wishes to change his location to meeting room No. 1, he pronounces two-zero-zero-one, after confirming the location which has been registered (S512A).

The CPU operates to transmit a voice guidance 13A. The content of the voice guidance 13A is, for example, "PLEASE SAY "OK" IF MEETING ROOM No. 1, EXT. No. 2001 IS OK.".

In Step S517A, the CPU 101 waits for the entry of vocal confirmation. The user, when the content of the voice guidance 13A is correct, pronounces "OK"

A voice message 14A is delivered in Step S518A. The content of this voice guidance 14A is, for example, "PLEASE SAY "PERMIT" WHEN YOU PERMIT TRANSFER, OTHERWISE, SAY "FORBID".". The CPU 101 then waits for entry of vocal instructions. If Mr. SATO as the user wishes to concentrate on the meeting and, hence, would not like to be disturbed by any transferred phone call, he says "FORBID" (S521A).

In Step S5111A, if the user who is Mr. SUZUKI in this case wishes to contact Mr. SATO, he pronounces "TRANSFER".

In each of the foregoing following embodiments, the sharp (#) button or key and the asterisk (*) button or key are mentioned as means for entering confirmation and transfer request codes. The use of such buttons or keys, however, are only illustrative.

Although in each embodiment the ID numbers. are given as five-digit numbers and the phone extension numbers are given as four-digit numbers, such numbers of digits are not exclusive and the ID numbers. and extension numbers may be expressed by, for example, ten digits.

Various statements of voice guidance used in the foregoing embodiments also are not exclusive and the invention can employ different statements of voice guidance.

It will be seen that the described embodiments offer the following advantages. When a user wishes to contact a person who is registered, he dials to contact the location display apparatus to know location of the person to be contacted and, if the person is permitting transfer of call, the call from the user can be automatically transferred to the location of the person, thus relieving the user from the burden of hooking on and then hooking off the telephone again to dial the number of phone of the place where the person is available.

In addition, the user can know whether a phone call to the person may cause any inconvenience on the person to be called.

Figure 32:
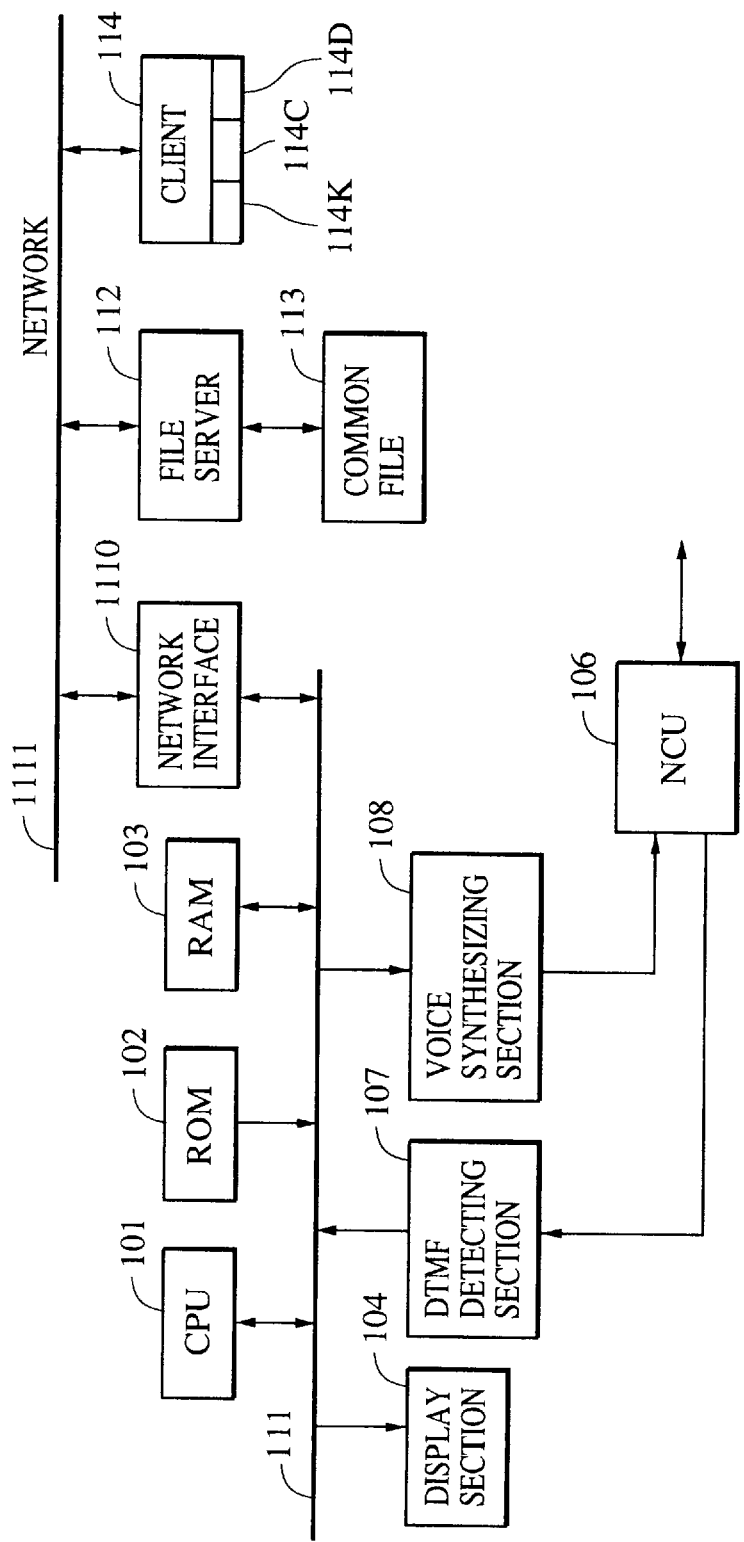
FIG. 32 is a block diagram of a ninth embodiment of the present invention.

FIG. 32 is a block diagram showing the location display apparatus according to the ninth embodiment. A network interface section 1110 is an interface section interconnecting a network cable 1111. As is evident from FIG. 32, the elements constituting apparatus other than this network interface 1110 are identical to those shown in FIG. 1.

A file server 112 which constitutes a network file system is connected to the network cable 1111. The file server 112 has a common file 113 which is commonly shared in the network file system.

Other client machines 114 such as a personal computer, etc. are connected to the network cable 1111.

The CPU 101 controls the extension number table shown in FIG. 2 and user information data shown in FIG. 18A which are stored in the RAM 103. The display section 104 displays the contents shown in FIG. 18A.

How the operator proceeds to change his/her location from a terminal device (not shown) which can output DTMF signals will be described with reference to FIG. 12, FIG. 8 and FIG. 9. In this ninth embodiment, operations except for step S528 are identical to those illustrated in FIG. 12 and FIG. 8.

In step S505, the operator (Mr. Sato) inputs the ID number 30001 and # by utilizing the terminal device which can generate a tone signal.

In the ninth embodiment, the contents of the location table stored in the RAM 103 is updated from those shown in FIG. 18A to those shown in FIG. 18B. Similarly, the location table shown in FIG. 18B is written to the common file 113 on the file server 112 via the network interface section 1110 and network cable 1111.

In steps S510 and S512, whether or not the circuit is disconnected may be detected instead of checking the time-out. The circuit disconnection in step S531 is performed by time-out from an output of the voice guidance 6 in step S530.

When inputting the key, the asterisk (*) can be used instead of sharp (#).

Next, the tenth embodiment of the present invention will be described.

The configuration of the location display apparatus according to the tenth embodiment is similar to that of the ninth embodiment shown in FIG. 32. However, the apparatus configuration of the tenth embodiment differs in that an extension number table and location table indicating the names of the locations corresponding to the telephone numbers are stored as a file on the common file 113.

Figure 33A:
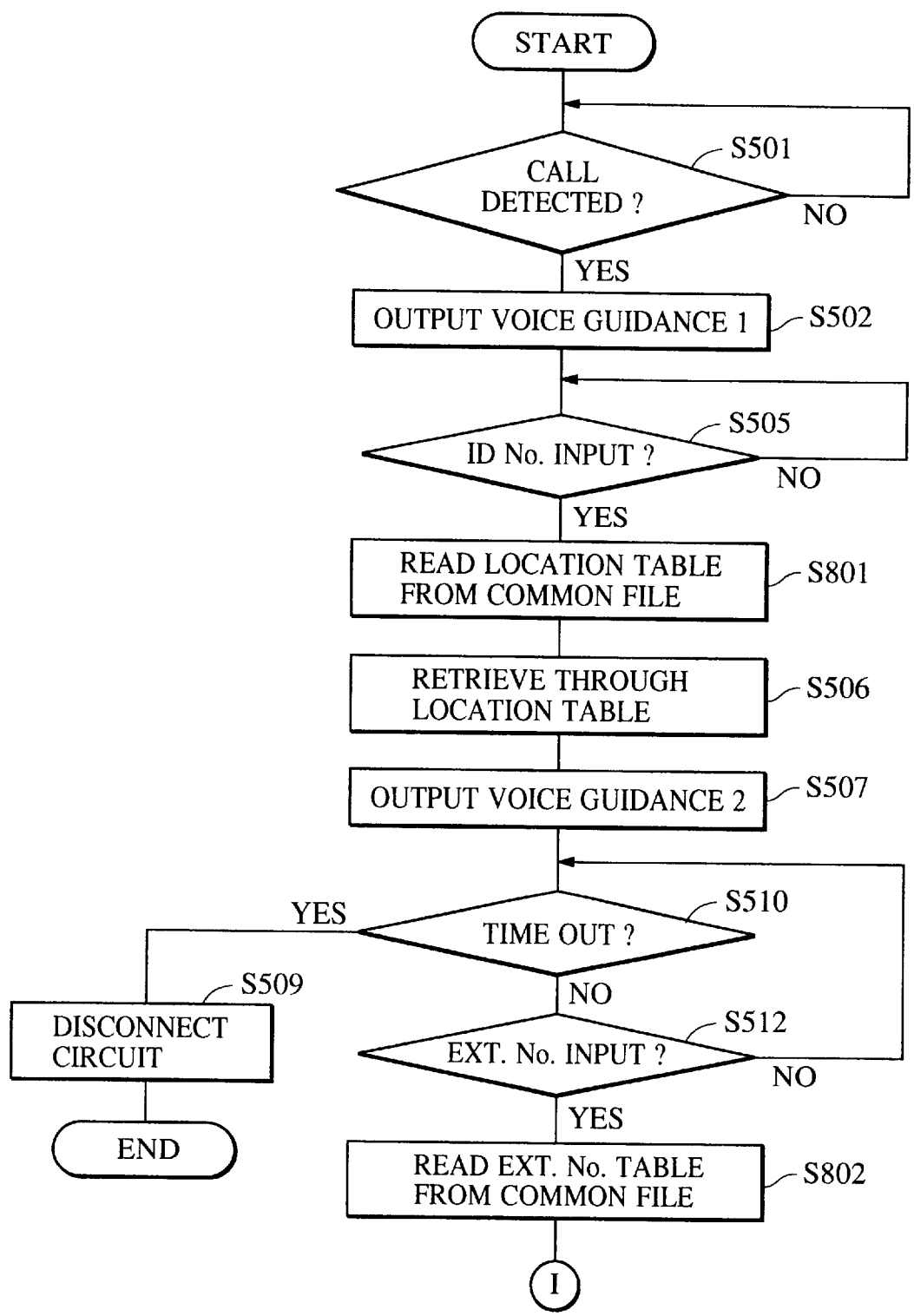
FIGS. 33A and 33B form a flowchart showing the operation of a tenth embodiment of the present invention.
Figure 33B:
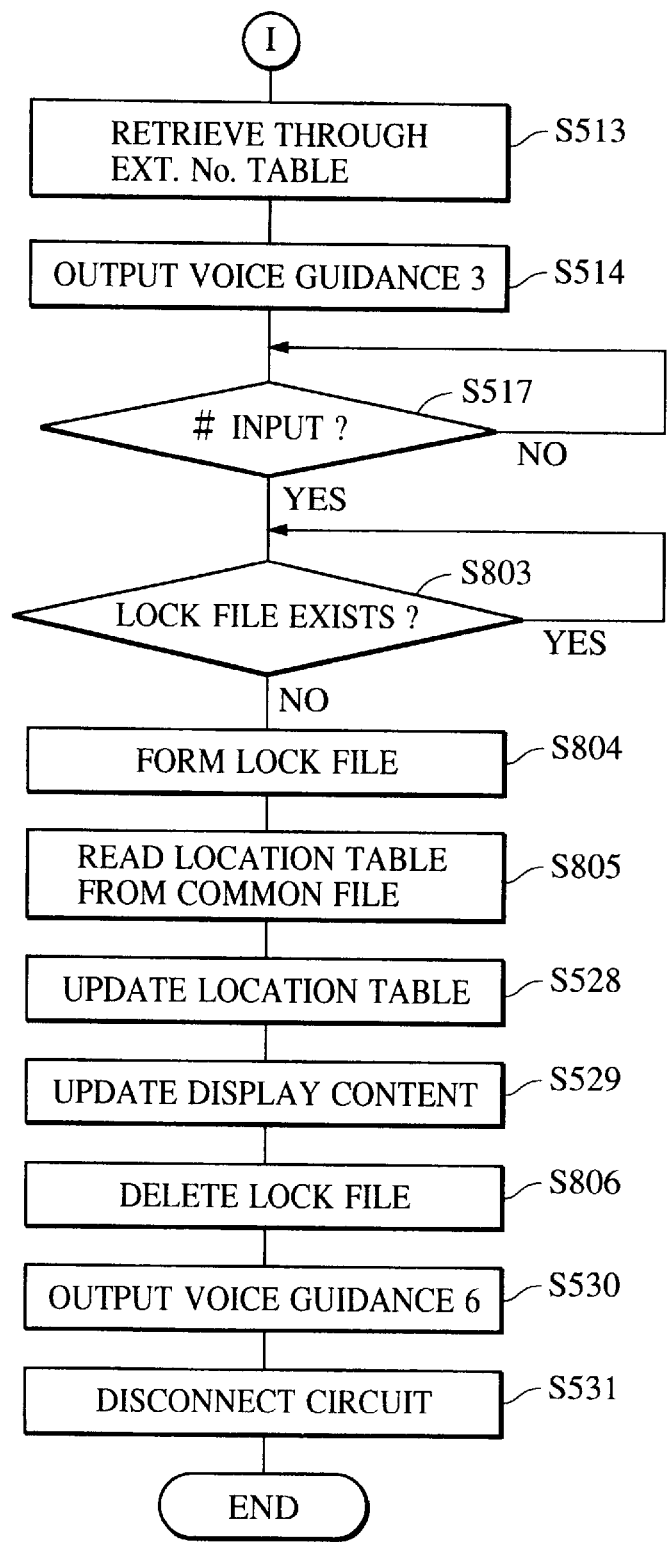

FIG. 33A and FIG. 33B are flowcharts showing the operation of the location display apparatus according to the tenth embodiment. Different points from the ninth embodiment will be described below.

First, after the ID number is input in Step S505, the location table is read to the RAM 103 (see Step S801) from the common file 113 via the network 1111 and network interface 1110. Thereafter, operating procedures from Step S506 up to Step S512 are identical to those in the ninth embodiment.

Next, after the extension number is input in Step S512, the extension number table is read to the RAM 103 (see Step S802) from the common file 113 via the network 1111 and network interface 1110. Thereafter, operating procedures from Step S513 up to Step S517 are identical to those in the ninth embodiment.

Thereafter, after the # key as a confirmation key is input in step S517, it is inspected whether or not a lock file exists indicating that another process is updating user information in the common file 113. If the lock file exists, the inspection continues to be performed until the lock file is deleted (Step S803).

If the lock file does not exist, a lock file is made anew on the common file 113 (Step S804). Next, the location table is read onto the RAM 103 from the common file 113 via the network (Step S805). Thereafter, operating procedures from step S528 up to Step S529 are identical to those in the ninth embodiment.

Thereafter, the lock file made in Step S804 is deleted (Step S806). The operating procedures after Step S806 are identical to those in the ninth embodiment.

Figure 34:
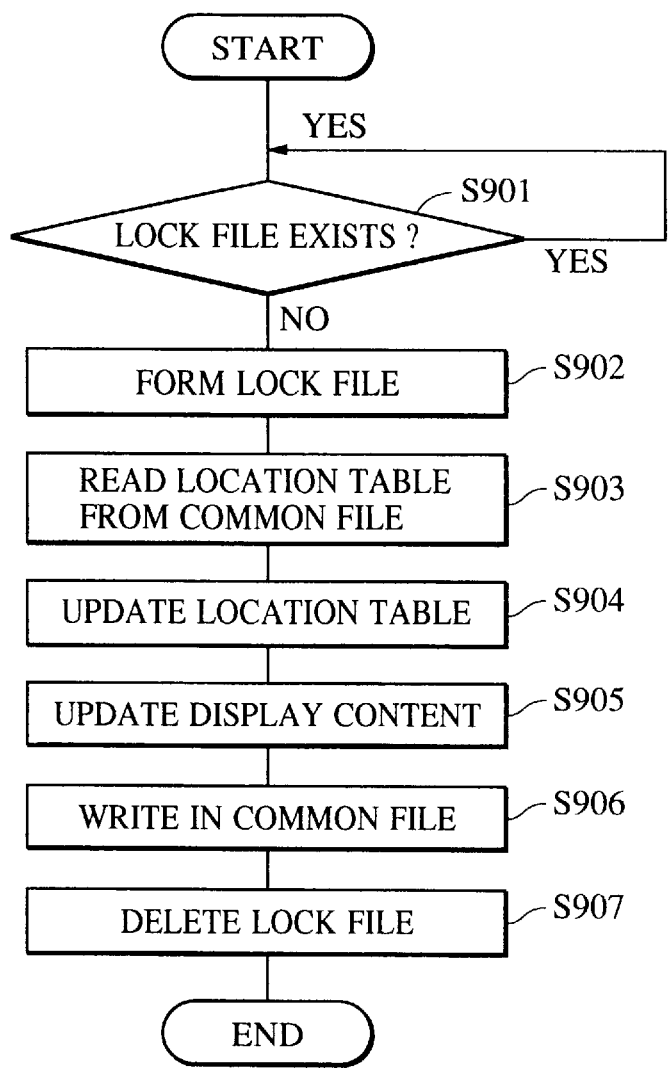
FIG. 34 is a flowchart showing the operation of a client machine used in the tenth embodiment.

FIG. 34 is a flowchart showing the operation of the controller 114C in the client machine 114 in the event that the location information is changed in the client machine 114 connected to the network.

When changing the location information, it is first inspected whether or not the lock file exists indicating that another process is updating the user information in the common file 113. If the lock file exists, the inspection continues to be performed until the lock file is deleted (step S901).

If the lock file does not exist, a lock file is made anew in the common file 113 (Step S902). Next, the location table is read from the common file 113 via the network (Step S903), and the read-in user information is changed (Step S904).

Thereafter, the user information is displayed on a display device 114D on the client machine 114, and the location table is written to the common file 113 (step S906), and then the lock file is deleted (step 907) to complete the procedures.

As described above, by employing the present invention, a current location registered in the location display apparatus can be freely changed from a remote area. Not only can the changed result be displayed but also the changed location information can be read from a computer connected to the network, thus forming a convenient system.

Moreover, the location information can be changed from the client machine connected to the network, in a flexible and efficient manner.

Besides those already mentioned above, many modifications and variations of the above embodiments may be made without departing from the novel and advantageous features of the present invention. Accordingly, all such modifications and variations are intended to be included within the scope of the appended claims.

We claim:

1. A location display apparatus connected to a communication line, comprising:

reception means for receiving a call from a calling party;

recognition means for recognizing, from the received call, a voice signal representing sounds pronounced by the calling party;

updating means for updating a plurality of location information to indicate respective updated locations of a respective plurality of users, wherein when the calling party is one of the plurality of users, said updating means updates the location information to indicate an updated location of the calling party based on the voice signal recognized by said recognition means;

display means for displaying the updated location information indicating the updated locations; and transmission means for transmitting, to the calling party over the transmission line, a message signal indicating the updated location of the calling party.

2. A location display apparatus according to claim 1, wherein said display means displays the plurality of undated locations of the plurality of users.

3. A location display apparatus according to claim 2, wherein the message transmitted by said transmission means indicates the undated location of a single user selected from the plurality of users according to the received call.

4. A location display apparatus according to claim 1, wherein the message includes a telephone number.

5. A location display apparatus according to claim 1, wherein said transmission means includes detection means for detecting a DTMF signal contained in the received call.

6. A location display apparatus according to claim 1, wherein said transmission means includes synthesis means for synthesizing a voice signal indicating the location information indicating one of the updated locations displayed on said display means.

7. A location display apparatus according to claim 1, wherein the message includes a voice signal received from the one user.

8. A location display apparatus according to claim 1, wherein the message includes a voice signal input from a microphone.

9. A location display apparatus according to claim 1, wherein the message is reproduced from a speaker.

10. A location display apparatus according to claim 1, wherein said updating means updates the location information responsive to a signal received from the communication line.

11. A method for controlling a location display apparatus connected to a communication line, the method comprising the steps of:

receiving a call from a calling party;

recognizing, from the received call, a voice signal representing sounds pronounced by the calling party;

updating a plurality of location information to indicate respective updated locations of the plurality of users, wherein when the calling party is one of the plurality of users, said updating step updates the location information to indicate an updated location of the calling party based on the voice signal recognized at said recognition step;

displaying the updated location information indicating the updated locations; and transmitting, to the calling party over the transmission line, a message signal indicating the updated location of the calling party.

12. A method according to claim 11, wherein the message includes an audio signal input by the one user.

13. A method according to claim 11, wherein the message includes a first portion including an audio signal input by the one user and a second portion indicating the updated location of the one user.

14. A location display apparatus according to claim 1, wherein the message includes a first portion including an audio signal input by the one user and a second portion indicating the updated location of the one user.

15. A location display apparatus, comprising:

connecting means for connecting to a communication line and to a microphone for inputting a voice signal;

updating means for updating a plurality of location information to indicate respective updated locations of a respective plurality of users;

display means for displaying the location information indicating the updated locations;

reception means for receiving a call directed to one of the plurality of users from a calling party; and transmission means for transmitting, to the calling party over the transmission line, a message signal indicating the updated location of the one user and the voice signal input from the microphone.

16. A location display apparatus, comprising:

connecting means for connecting to a communication line and to a speaker;

input means for inputting a voice signal received from the communication line to the speaker to be reproduced;

updating means for updating a plurality of location information to indicate respective updated locations of a respective plurality of users;

display means for displaying the location information indicating the updated locations;

reception means for receiving a call directed to one of the plurality of users from a calling party; and transmission means for transmitting, to the calling party over the communication line, a message signal indicating the updated location of the one user.

* * * * *

UNITED STATES PATENT AND TRADEMARK OFFICE
CERTIFICATE OF CORRECTION

PATENT NO. : 5,867,563

DATED : February 2, 1999

INVENTOR(S) : MASAMI KATO ET AL.

It is certified that error appears in the above-identified patent and that said Letters Patent is hereby corrected as shown below:

COLUMN 19

Line 6, "undated" should read --updated--.

Signed and Sealed this

Ninth Day of November, 1999

Attest:

Q. TODD DICKINSON

*Attesting Officer*  *Acting Commissioner of Patents and Trademarks*